(12) United States Patent
Jo

(10) Patent No.: US 10,989,790 B2
(45) Date of Patent: Apr. 27, 2021

(54) DISTANCE MEASURING APPARATUS, ELECTRONIC APPARATUS, AND METHOD OF CONTROLLING DISTANCE MEASURING APPARATUS

(71) Applicant: Sony Semiconductor Solutions Corporation, Kanagawa (JP)

(72) Inventor: Kensei Jo, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 224 days.

(21) Appl. No.: 15/760,438

(22) PCT Filed: Jul. 6, 2017

(86) PCT No.: PCT/JP2017/024749
§ 371 (c)(1),
(2) Date: Mar. 15, 2018

(87) PCT Pub. No.: WO2018/037728
PCT Pub. Date: Mar. 1, 2018

(65) Prior Publication Data
US 2018/0259616 A1     Sep. 13, 2018

(30) Foreign Application Priority Data
Aug. 23, 2016   (JP) .............................. JP2016-162320

(51) Int. Cl.
*G01S 5/16* (2006.01)
*G01S 11/12* (2006.01)
(Continued)

(52) U.S. Cl.
CPC ................. *G01S 5/16* (2013.01); *G01S 1/70* (2013.01); *G01S 7/4915* (2013.01); *G01S 11/12* (2013.01);
(Continued)

(58) Field of Classification Search
CPC .......... G01S 1/70; G01S 17/003; G01S 17/36; G01S 5/16; G01S 11/12; G01S 17/89;
(Continued)

(56) References Cited

U.S. PATENT DOCUMENTS 5,751,408 A * 5/1998 Ohtomo ............... G01C 15/004
356/5.14
2005/0036660 A1   2/2005 Otsuka et al.
(Continued)

FOREIGN PATENT DOCUMENTS

EP    2 858 268 A1    4/2015
JP    11-143640 A    5/1999
(Continued)

OTHER PUBLICATIONS

International Search Report and English translation thereof dated Oct. 3, 2017 in connection with International Application No. PCT/JP2017/024749.
(Continued)

*Primary Examiner* — Yuqing Xiao
*Assistant Examiner* — Amir J Askarian
(74) *Attorney, Agent, or Firm* — Wolf, Greenfield & Sacks, P.C.

(57) ABSTRACT

To reduce power consumption in an apparatus for measuring a distance on the basis of a phase difference between light beams.
A distance measuring apparatus includes: a phase difference detecting section; and a distance measuring section. In the distance measuring apparatus, the phase difference detecting section detects a phase difference between light beams from a pair of external light sources. In addition, in the distance measuring apparatus, the distance measuring section acquires any one of a distance from one of the pair of external light sources and an interval between the pair of external light sources as known data and measures a distance from another of the pair of external light sources on a basis of the known data and the phase difference.

10 Claims, 28 Drawing Sheets

(51) Int. Cl.

| | | |
|---|---|---|
| *G01S 17/36* | (2006.01) | |
| *G01S 17/89* | (2020.01) | |
| *G01S 7/4915* | (2020.01) | |
| *G01S 1/70* | (2006.01) | |
| *G01S 17/931* | (2020.01) | |
| *G01S 17/00* | (2020.01) | |
| *G06T 11/60* | (2006.01) | |

(52) U.S. Cl.
CPC ............ *G01S 17/003* (2013.01); *G01S 17/36* (2013.01); *G01S 17/89* (2013.01); *G01S 17/931* (2020.01); *G01S 2201/01* (2019.08); *G06T 11/60* (2013.01)

(58) Field of Classification Search
CPC .... G01S 17/894; G01S 17/931; G01S 7/4915; G01S 2201/01; G01S 17/93; G06T 11/60; G06T 2207/10024; G06T 2207/10048; G06T 2207/10152; G06T 2207/30168; G06T 7/0002; G06T 7/55; G03B 13/36; H04N 5/232; H04N 5/2354; H04N 9/04515; H04N 9/0455; H04N 9/04553; G01C 3/06; G02B 5/201; G02B 7/34
See application file for complete search history.

(56) References Cited

U.S. PATENT DOCUMENTS

| | | | | |
|---|---|---|---|---|
| 2009/0279107 | A1* | 11/2009 | Deliwala | A63F 13/213 356/623 |
| 2010/0271617 | A1* | 10/2010 | Damink | G01S 17/36 356/5.09 |
| 2011/0144941 | A1* | 6/2011 | Roberts | G01B 11/14 702/152 |
| 2012/0162633 | A1* | 6/2012 | Roberts | G01S 5/16 356/5.09 |
| 2013/0120361 | A1* | 5/2013 | Wang | G01B 11/24 345/419 |
| 2013/0330088 | A1 | 12/2013 | Oshima et al. | |
| 2014/0285818 | A1 | 9/2014 | Holz | |
| 2015/0222798 | A1* | 8/2015 | Fuchikami | G06K 9/00624 348/135 |
| 2016/0309143 | A1* | 10/2016 | Fu | H04N 5/2256 |
| 2017/0234976 | A1* | 8/2017 | Grauer | G01S 7/4868 356/5.04 |
| 2018/0038961 | A1* | 2/2018 | Smits | G01S 7/4817 |
| 2018/0067194 | A1* | 3/2018 | Wodrich | G01S 13/58 |
| 2020/0096320 | A1* | 3/2020 | Williams | G01B 11/14 |

FOREIGN PATENT DOCUMENTS

| | | |
|---|---|---|
| JP | 2005-092861 A | 4/2005 |
| JP | 2011-154626 A | 8/2011 |
| JP | 2013-519092 A | 5/2013 |
| JP | 2014-220787 A | 11/2014 |
| WO | WO 2014/200589 A2 | 12/2014 |

OTHER PUBLICATIONS

International Written Opinion and English translation thereof dated Oct. 3, 2017 in connection with International Application No. PCT/JP2017/024749.

International Preliminary Report on Patentability and English translation thereof dated Mar. 7, 2019 in connection with International Application No. PCT/JP2017/024749.

* cited by examiner

FIG. 8

| (x COORDINATE, y COORDINATE) | PIXEL DATA | |
|---|---|---|
| | Q1 | Q2 |
| (0, 0) | 10 | 20 |
| (0, 1) | 10 | 20 |
| (0, 2) | 11 | 19 |
| | ⋮ | ⋮ |

FIG. 12
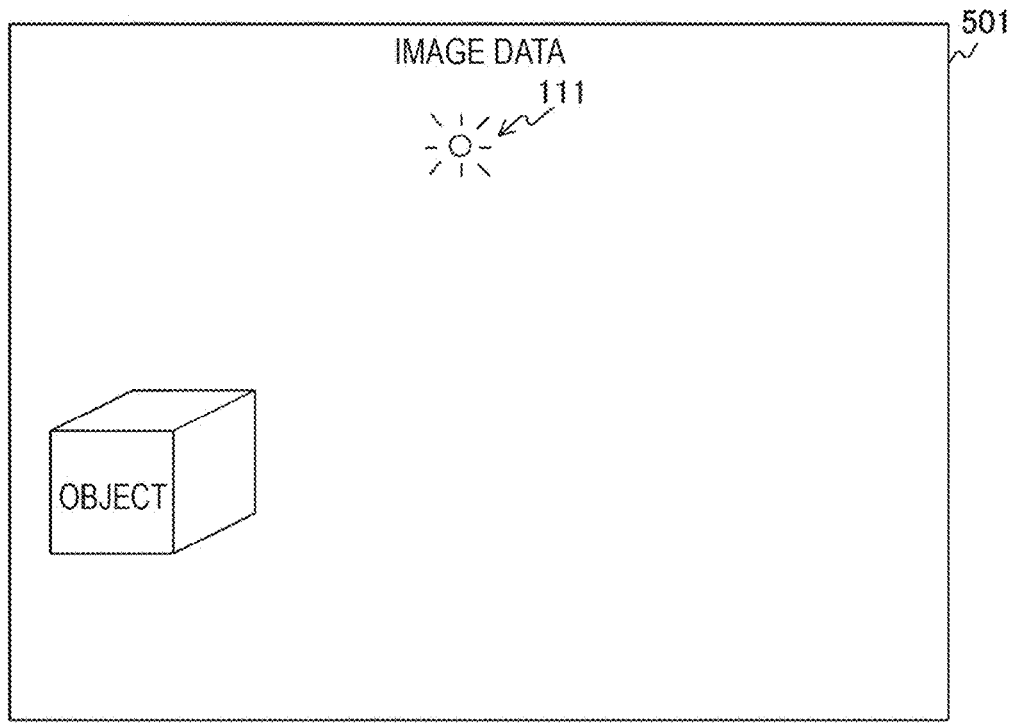
a
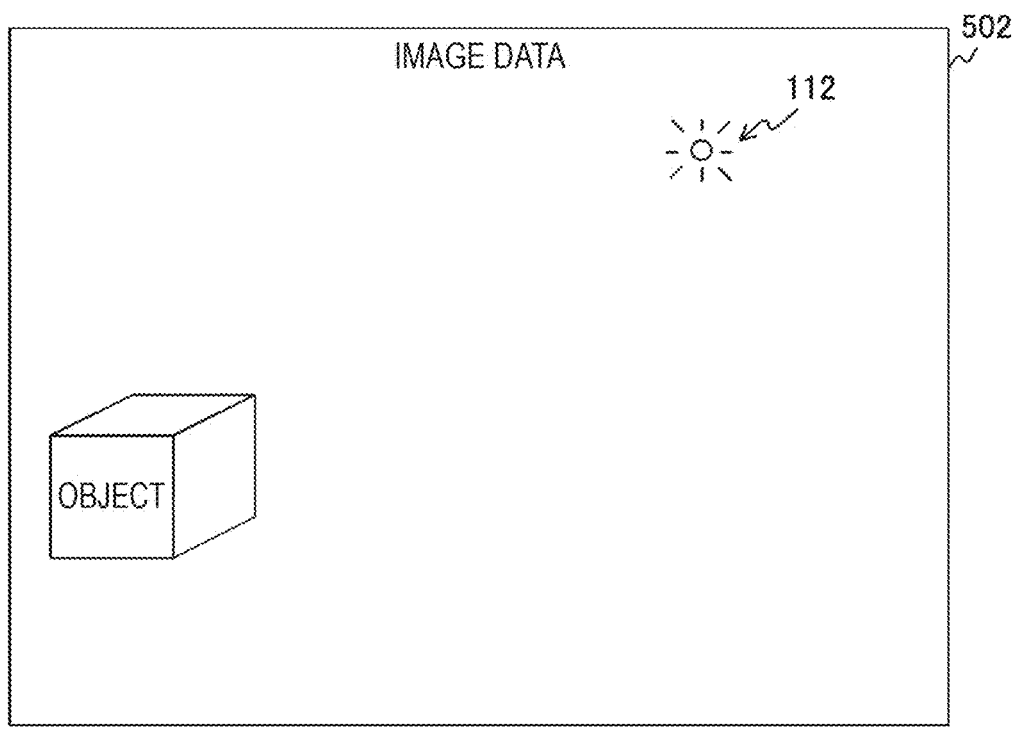
b

DISTANCE MEASURING APPARATUS, ELECTRONIC APPARATUS, AND METHOD OF CONTROLLING DISTANCE MEASURING APPARATUS

CROSS-REFERENCE TO RELATED APPLICATIONS

The present application claims the benefit under 35 U.S.C. § 371 as a U.S. National Stage Entry of International Application No. PCT/JP2017/024749, filed in the Japanese Patent Office as a Receiving Office on Jul. 6, 2017, which claims priority to Japanese Patent Application Number JP 2016-162320, filed in the Japanese Patent Office on Aug. 23, 2016, each of which applications is hereby incorporated by reference in its entirety.

TECHNICAL FIELD

The present technology relates to a distance measuring apparatus, an electronic apparatus, and a method of controlling the distance measuring apparatus. Specifically, the present technology relates to a distance measuring apparatus for measuring a distance on the basis of a phase difference of light, an electronic apparatus, and a method of controlling the distance measuring apparatus.

BACKGROUND ART

Conventionally, a distance measuring method referred to as "time of flight (ToF) method" has been frequently used in apparatuses and devices having a distance measuring function. This ToF method is a method in which an apparatus irradiates an object with irradiation light of a sine wave or rectangular wave and the apparatus receives reflected light from the object to measure a distance on the basis of a phase difference between the irradiation light and the reflected light. For example, there is proposed an apparatus that causes a plurality of light receiving elements arranged in array to receive reflected light and measures a distance by the ToF method (see, for example, Non-Patent Literature 1).

CITATION LIST

Patent Literature

Patent Literature 1: JP 2013-519092T

DISCLOSURE OF INVENTION

Technical Problem

In the above-described conventional technology, the light receiving elements in array can measure a distance from each of a plurality of objects and generate a depth map. However, in a case where a distance from an object is long or in a case where reflectance of an object is low, a quantity of reflected light is decreased to reduce distance measuring accuracy. In order to maintain the distance measuring accuracy in such a case, it is necessary to increase a quantity of irradiation light, and an increase in power consumption of an apparatus that emits the irradiation light is problematic. An increase in power consumption is greatly disadvantageous for, in particular, mobile devices that operate with batteries, and therefore it is necessary to take measures.

The present technology has been made in view of the above circumstances, and an object thereof is to reduce power consumption in an apparatus for measuring a distance on the basis of a phase difference between light beams.

Solution to Problem

The present technology has been made to solve the above-described problem, and a first aspect thereof is a distance measuring apparatus, and a method of controlling the distance measuring apparatus, the distance measuring apparatus including: a phase difference detecting section configured to detect a phase difference between light beams from a pair of external light sources; and a distance measuring section configured to acquire any one of a distance from one of the pair of external light sources and an interval between the pair of external light sources as known data and measure a distance from another of the pair of external light sources on a basis of the known data and the phase difference. With this, it is possible to measure the distance from the other of the pair of external light sources on the basis of the known data and the phase difference.

In addition, in this first aspect, the pair of external light sources may be irradiation light sources that emit irradiation light. The distance measuring section may acquire the interval between the pair of external light sources as the known data. With this, it is possible to measure the distance from the other of the pair of external light sources on the basis of the interval between the pair of external light sources and the phase difference.

In addition, in this first aspect, a pair of light emitting sections configured to emit irradiation light may be further included. With this, it is possible to measure a distance from an external light source outside the distance measuring apparatus including the light emitting sections.

In addition, in this first aspect, the pair of external light sources may be arranged at predetermined positions on a linear light source. With this, it is possible to measure distances from the predetermined positions on the linear light source.

In addition, in this first aspect, the one of the pair of external light sources may be an irradiation light source that emits irradiation light and the other may be a reflected light source that reflects the irradiation light. The distance measuring section may acquire the distance from the one of the pair of external light sources as the known data. With this, it is possible to measure the distance from the other of the pair of external light sources on the basis of the distance from the one of the pair of external light sources and the phase difference.

In addition, in this first aspect, the irradiation light source may include a pair of irradiation light sources that are alternately turned on. The distance measuring section may acquire a distance from one of the pair of irradiation light sources on a basis of an interval between the pair of irradiation light sources. With this, it is possible to acquire the distance from the one of the pair of irradiation light sources on the basis of the interval between the pair of irradiation light sources that are alternately turned on.

In addition, in this first aspect, the distance measuring section may acquire plane coordinates of a projected point obtained by projecting each of a plurality of spatial points whose three-dimensional coordinates are known onto a predetermined imaging plane and acquire the known data on a basis of the plane coordinates. With this, it is possible to acquire the known data on the basis of the plane coordinates of the projected point.

In addition, in this first aspect, the distance measuring section may detect a unit vector showing a direction from each of the pair of external light sources and measure a distance from the other on a basis of the unit vector, the known data, and the phase difference. With this, it is possible to measure the distance from the other on the basis of the unit vector, the known data, and the phase difference.

In addition, in this first aspect, the phase difference detecting section and the distance measuring section may be mounted on a vehicle. The pair of external light sources may be tail lamps of another vehicle that is different from the vehicle. The distance measuring section may measure a distance between the vehicle and the other vehicle. With this, it is possible to measure the distance between the two vehicles on the basis of the known data and the phase difference.

In addition, a second aspect of the present technology is an electronic apparatus including: a phase difference detecting section configured to detect a phase difference between light beams from a pair of external light sources; a distance measuring section configured to acquire any one of a distance from one of the pair of external light sources and an interval between the pair of external light sources as known data and measure a distance from another of the pair of external light sources on a basis of the known data and the phase difference; and a control section configured to cause a display section to display predetermined information on a basis of the measured distance. With this, it is possible to measure the distance from the other of the pair of external light sources on the basis of the known data and the phase difference and display the predetermined information on the basis of the distance.

Advantageous Effects of Invention

According to the present technology, an apparatus for measuring a distance on the basis of a phase difference of light can have an excellent effect of reducing power consumption. Note that the effect disclosed herein is not necessarily limited and may be any effect disclosed in the present disclosure.

BRIEF DESCRIPTION I/F DRAWINGS

FIG. 8 is a diagram showing an example of pixel data in the first embodiment of the present technology.

FIG. 12 is diagrams showing examples of image data in the first embodiment of the present technology.

MODE(S) FOR CARRYING OUT THE INVENTION

Hereinafter, forms for implementing the present technology (hereinafter, referred to as "embodiments") will be described. Description will be provided in the following order.

1. First embodiment (an example of detecting a phase difference between light beams from a pair of external light sources and measuring a distance)

2. Second embodiment (an example of detecting a phase difference between light beams from a pair of external light sources on a linear light source and measuring a distance)

1. First Embodiment

[Configuration Example of Distance Measuring System]

Figure 1:
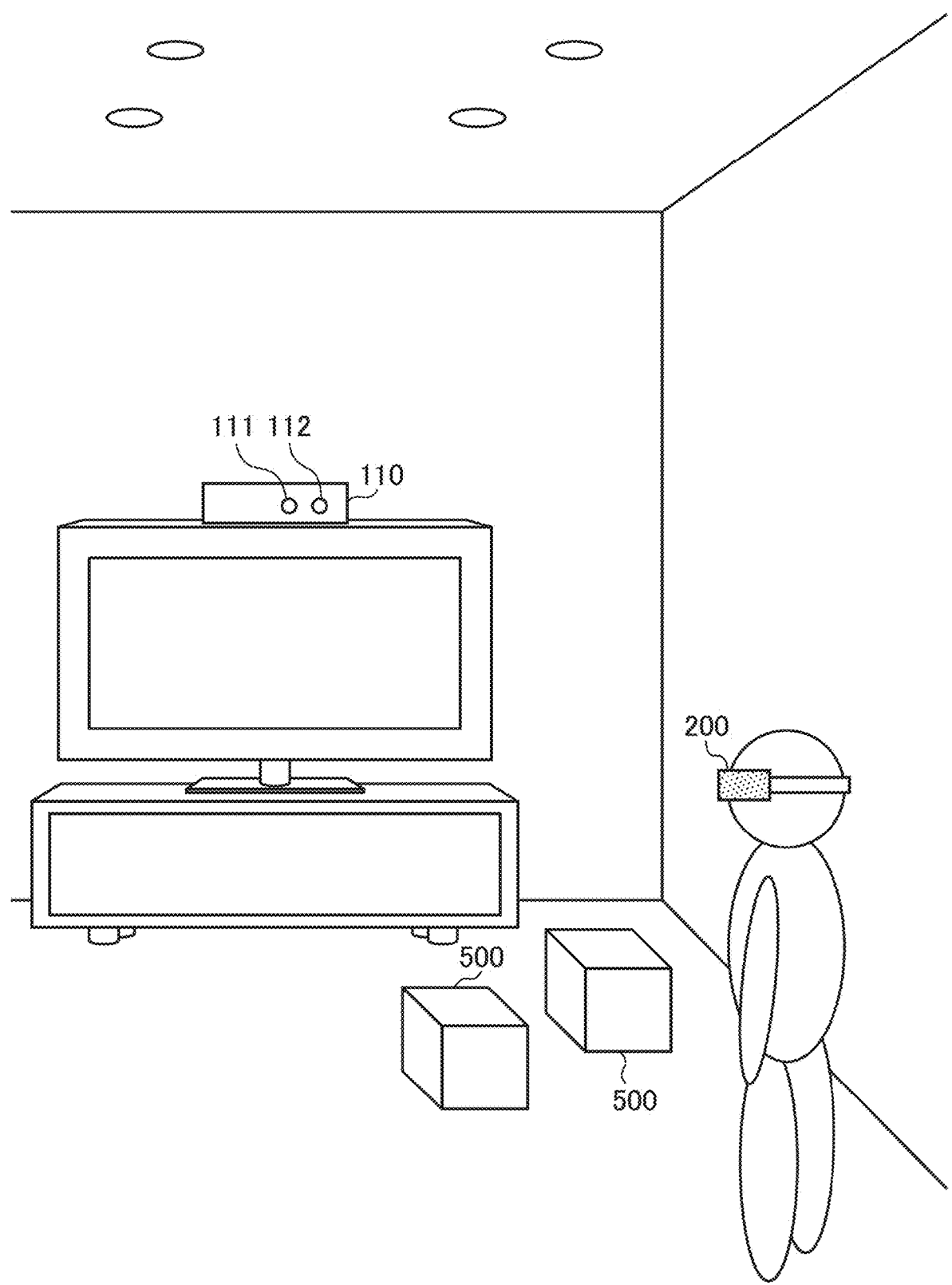
FIG. 1 is a general view showing an example of a distance measuring system in a first embodiment of the present technology.

FIG. 1 is a general view showing an example of a distance measuring system in a first embodiment of the present technology. This distance measuring system is a system for measuring distances from surrounding objects 500 and includes an external device 110 and a VR terminal 200.

The external device 110 is a device installed inside a room and includes irradiation light sources 111 and 112 for emitting irradiation light. The external device 110 is expected to be various home electric appliances such as a tuner, a recorder, and a ToF camera. Those irradiation light sources 111 and 112 are point light sources provided at specified positions of the external device 110 and emit, for example, pulsed light as irradiation light in synchronization with a common synchronization signal having a predetermined frequency (e.g., 20 megahertz). This irradiation light is reflected by surfaces of the various objects 500 existing around a user. A reflected light source, which is a position at which the irradiation light is reflected, and an external light source such as the irradiation light sources 111 and 112 are used to measure a distance.

The VR terminal 200 generates a depth map showing a distance from each of the objects 500 around the user. This VR terminal 200 is a goggle-type device including a display section such as a liquid crystal display and is mounted on a head of the user. Further, the VR terminal 200 performs processing of displaying various pieces of information on the display section on the basis of the generated depth map. Note that the VR terminal 200 is an example of an electronic apparatus recited in CLAIMS.

[Configuration Example of VR Terminal]

Figure 2:
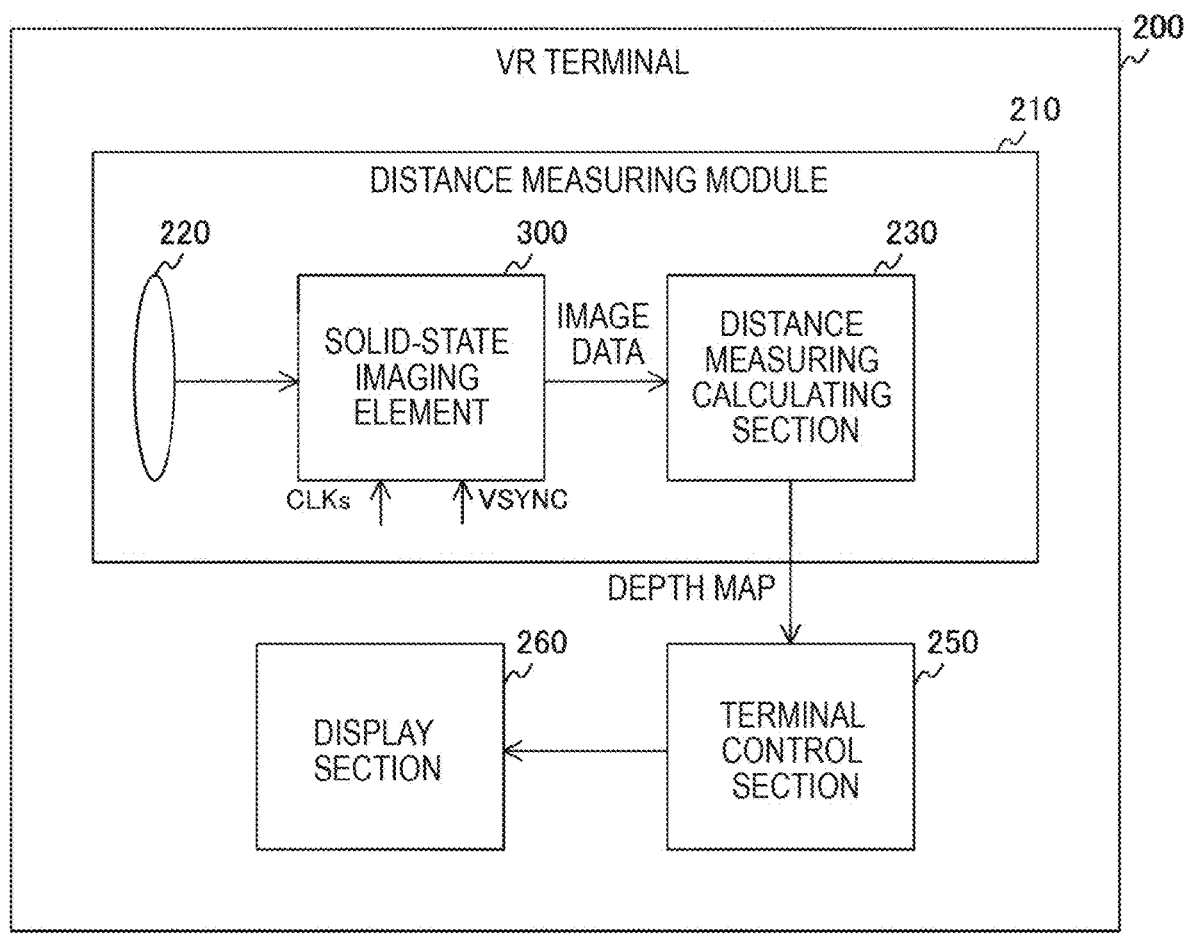
FIG. 2 is a block diagram showing a configuration example of a virtual reality (VR) terminal in the first embodiment of the present technology.

FIG. 2 is a block diagram showing a configuration example of the VR terminal 200 in the first embodiment of the present technology. This VR terminal 200 includes a distance measuring module 210, a terminal control section 250, and a display section 260. Further, the distance measuring module 210 includes an imaging lens 220, a solid-state imaging element 300, and a distance measuring calculating section 230. Note that the distance measuring module 210 is an example of a distance measuring apparatus recited in CLAIMS.

The imaging lens 220 collects irradiation light from the irradiation light sources 111 and 112 or reflected light of the irradiation light and guides the irradiation light or reflected light toward the solid-state imaging element 300.

The solid-state imaging element 300 performs photoelectric conversion of light from the imaging lens 220 to generate image data. A vertical synchronization signal VSYNC having a predetermined frequency and a reference clock CLKs are input to this solid-state imaging element 300. The frequency of the vertical synchronization signal VSYNC is set to have a value (e.g., 60 hertz) which is lower than a frequency (e.g., 20 megahertz) of irradiation light emitted by the irradiation light sources 111 and 112. Further, a frequency of the reference clock CLKs is set to have a value the same as that of the frequency of the irradiation light. However, the reference clock CLKs does not synchronize with the irradiation light of the irradiation light sources 111 and 112 and therefore does not necessarily have a phase matching with a phase of the irradiation light. The solid-state imaging element 300 generates image data in synchronization with the vertical synchronization signal VSYNC and the like and supplies the image data to the distance measuring calculating section 230.

The distance measuring calculating section 230 detects a phase difference $dP_{12}$ between irradiation light from the irradiation light source 111 and irradiation light from the irradiation light source 112 and measures a distance from at least one of the irradiation light sources 111 and 112 on the basis of the phase difference $dP_{12}$ and an interval W between the irradiation light sources 111 and 112. For example, only a distance $E_1$ from the irradiation light source 111 is measured.

Further, after the distance $E_1$ is measured, the distance measuring calculating section 230 detects a phase difference $dP_{1d}$ between irradiation light from the irradiation light source 111 and reflected light of the irradiation light and measures a distance Ed from a reflected light source that emits the reflected light on the basis of the known distance $E_1$ and the phase difference $dP_{1d}$. This reflected light source corresponds to a reflected point at which irradiation light is reflected by a surface of an object. That is, the distance Ed indicates a distance from the reflected point on the surface of the object. The distance measuring calculating section 230 measures the distance Ed from each of a plurality of reflected light sources, generates a depth map showing measurement results thereof, and supplies the depth map to the terminal control section 250.

The terminal control section 250 controls the whole VR terminal 200. This terminal control section 250 performs processing that causes the display section 260 to display various pieces of information on the basis of the depth map. For example, the terminal control section 250 performs processing that causes an item for use in a game to be displayed at a position of the object on the basis of the distance from the object shown by the depth map. Note that the terminal control section 250 is an example of a control section recited in CLAIMS.

The display section 260 displays information under control of the terminal control section 250. The display section 260 is expected to be a liquid crystal display, an organic electro luminescence (EL) display, or the like.

Note that the distance measuring module 210 is provided in the VR terminal 200. However, the distance measuring module 210 may be provided in an apparatus or device other than the VR terminal 200 as long as the apparatus or device uses distance information. For example, the distance measuring module 210 may be provided in a ToF camera, a smartphone, a personal computer, an automobile, or the like.

[Configuration Example of Solid-State Imaging Element]

Figure 3:
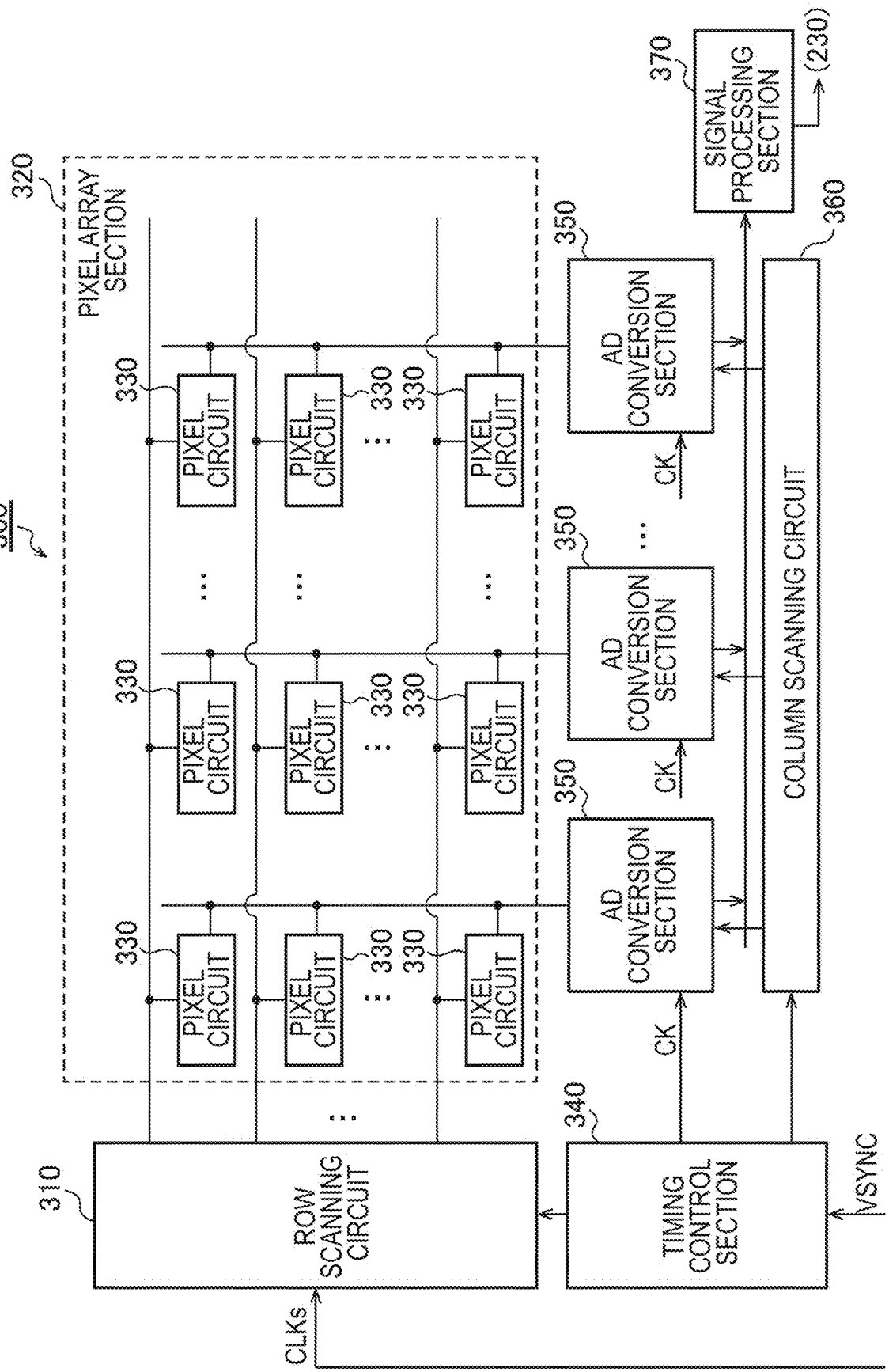
FIG. 3 is a block diagram showing a configuration example of a solid-state imaging element in the first embodiment of the present technology.

FIG. 3 is a block diagram showing a configuration example of the solid-state imaging element 300 in the first embodiment of the present technology. This solid-state imaging element 300 includes a row scanning circuit 310, a pixel array section 320, a timing control section 340, a plurality of analog to digital (AD) conversion sections 350, a column scanning circuit 360, and a signal processing section 370. A plurality of pixel circuits 330 are arranged in two-dimensional lattice in the pixel array section 320. Hereinafter, an aggregation of the pixel circuits 330 arranged in a predetermined direction is referred to as "row", and an aggregation of the pixel circuits 330 arranged in a direction vertical to the row is referred to as "column". The AD conversion sections 350 described above are provided for the respective columns.

The timing control section 340 controls the row scanning circuit 310, the AD conversion sections 350, and the column scanning circuit 360 in synchronization with a vertical synchronization signal VSYNC.

The row scanning circuit 310 selects rows in order and causes a pixel signal to be output. Each pixel circuit 330 outputs a pixel signal having a level based on a quantity of received light under control of the row scanning circuit 310.

Each AD conversion section 350 performs AD conversion of a pixel signal from a corresponding column. This AD conversion section 350 outputs the pixel signal that has been subjected to AD conversion to the signal processing section 370 as pixel data under control of the column scanning circuit 360. The column scanning circuit 360 selects the AD conversion sections 350 in order and causes the AD conversion sections 350 to output pixel data.

The signal processing section 370 performs signal processing such as correlated double sampling (CDS) processing on image data including the pixel data. This signal processing section 370 supplies the image data that has been subjected to the signal processing to the distance measuring calculating section 230.

[Configuration Example of Pixel Circuit]

Figure 4:
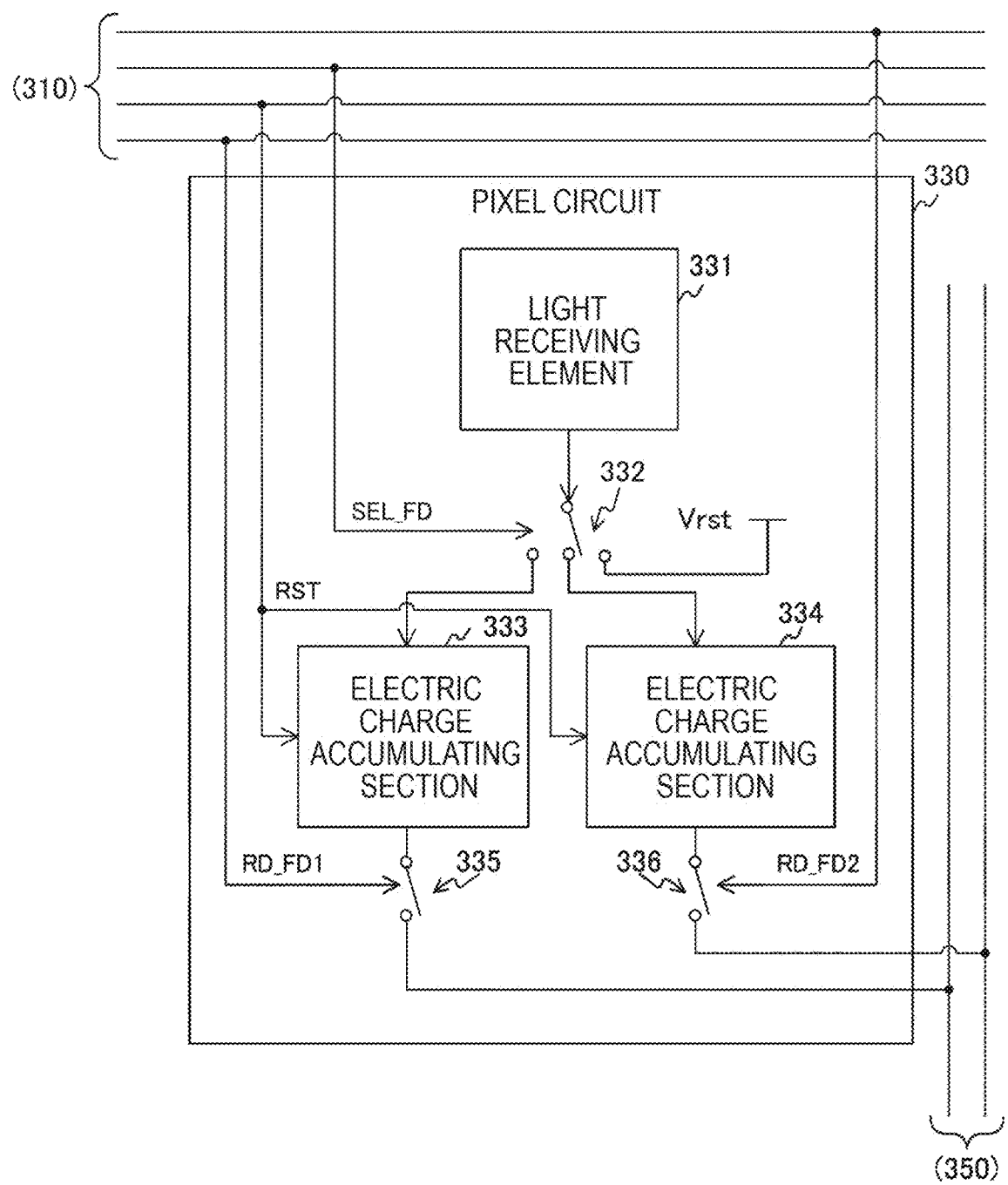
FIG. 4 is a circuit diagram showing a configuration example of a pixel circuit in the first embodiment of the present technology.

FIG. 4 is a block diagram showing a configuration example of the pixel circuit 330 in the first embodiment of the present technology. This pixel circuit 330 includes a light receiving element 331, a transfer switch 332, electric charge accumulating sections 333 and 334, and selection switches 335 and 336.

The light receiving element 331 performs photoelectric conversion of light and generates electric charges. This light receiving element 331 can be, for example, a photodiode.

The transfer switch 332 connects the light receiving element 331 to any one of the electric charge accumulating section 333, the electric charge accumulating section 334, and a reset power supply Vrst under control of the row scanning circuit 310. This transfer switch 332 is implemented as, for example, a plurality of metal-oxide-semiconductor (MOS) transistors or the like. In a case where the light receiving element 331 is connected to the reset power supply Vrst, an electric charge output from a drain of the MOS transistor is discarded, and an electric charge of the light receiving element 331 is initialized.

Each of the electric charge accumulating sections 333 and 334 accumulates electric charges and generates voltage based on an accumulation amount thereof. The electric charge accumulating sections 333 and 334 can be, for example, floating diffusion layers.

The selection switch 335 opens and closes a line between the electric charge accumulating section 333 and the AD conversion section 350 under control of the row scanning circuit 310. The selection switch 336 opens and closes a line between the electric charge accumulating section 334 and the AD conversion section 350 under control of the row scanning circuit 310. For example, the selection switch 335 transitions to a closed state when a FD readout signal RD_FD1 is supplied by the row scanning circuit 310, and the selection switch 336 transitions to a closed state when a FD readout signal RD_FD2 is supplied by the row scanning circuit 310. Each of the selection switches 335 and 336 is implemented as, for example, a MOS transistor or the like.

Figure 5:
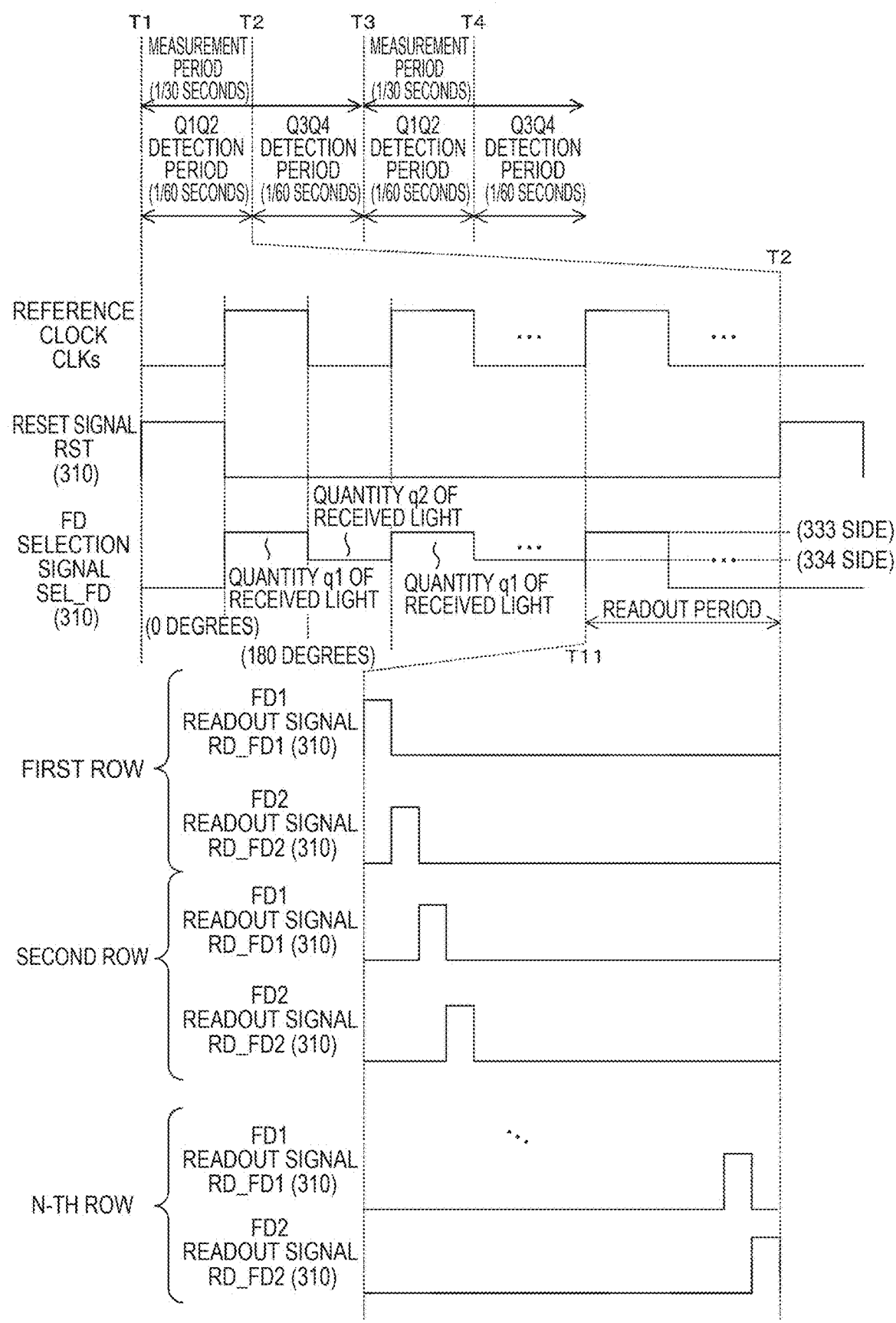
FIG. 5 is a timing chart showing an example of operation of a solid-state imaging element in a Q1Q2 detection period in the first embodiment of the present technology.

FIG. 5 is a timing chart showing an example of exposure control of the pixel circuit in a Q1Q2 detection period in the first embodiment of the present technology. When predetermined operation for causing the VR terminal 200 to measure a distance is performed, the pixel circuit 330 alternately and repeatedly detects quantities Q1 and Q2 of received light and detects quantities Q3 and Q4 of received light. Hereinafter, a detection period of the quantities Q1 and Q2 of received light is referred to as "Q1Q2 detection period", and a detection period of the quantities Q3 and Q4 of received light is referred to as "Q3Q4 detection period". Further, a period including the Q1Q2 detection period and the Q3Q4 detection period is referred to as "measurement period". A length of each of the Q1Q2 and Q3Q4 detection periods is a cycle of a vertical synchronization signal VSYNC (e.g., 1/60 seconds).

Herein, the quantity Q1 of received light is obtained by accumulating a quantity q1 of received light from 0 degrees to 180 degrees over the Q1Q2 detection period when a specified phase (e.g., rising) of a reference clock CLKs is set to 0 degrees. A frequency of the reference clock CLKs is 20 megahertz (MHz), i.e., high, and therefore the quantity q1 of received light per cycle thereof (1/20 microseconds) is extremely small. Thus, detection is difficult. Therefore, the pixel circuit 330 accumulates each quantity q1 over the Q1Q2 detection period such as 1/60 seconds that is longer than the cycle of the reference clock CLKs (1/20 microseconds) and detects a total quantity thereof as the quantity Q1 of received light. Further, the quantity Q2 of received light is obtained by accumulating a quantity q2 of received light from 180 degrees to 360 degrees over the Q1Q2 detection period.

Further, the quantity Q3 of received light is obtained by accumulating a quantity q3 of received light from 90 degrees to 270 degrees over the Q3Q4 detection period. Further, the quantity Q4 of received light is obtained by accumulating a quantity q4 of received light from 270 degrees to 90 degrees over the Q3Q4 detection period.

The distance measuring calculating section 230 can substitute those quantities Q1, Q2, Q3, and Q4 of received light for the following expression to calculate a phase difference dP between the reference clock CLKs and the received light. A method of deriving this expression is disclosed in, for example, "Larry Li, "Time-of-Flight Camera—An Introduction", Texas Instruments, Technical White Paper SLOA190B January 2014 Revised May 2014".

$$dP = \tan^{-1}\{(Q3-Q4)/(Q1-Q2)\} \qquad \text{Expression 1}$$

The part "$\tan^{-1}(\ )$" in the above expression indicates an inverse function of a tangent function.

For example, the quantities Q1 and Q2 of received light are detected in the Q1Q2 detection period from a timing T1 to a timing T2. First, the row scanning circuit 310 supplies reset signals RST to all the rows over a predetermined pulse period from the timing T1. In response to those reset signals RST, accumulation amounts of electric charges in the electric charge accumulating sections 333 and 334 in all the rows are initialized. Further, in response to FD selection signals SEL_FD, the row scanning circuit 310 initializes electric charges of the light receiving elements 331 in all the rows.

Then, the row scanning circuit 310 causes electric charges, which are generated by the light receiving elements 331 in all the rows in response to the FD selection signals SEL_FD from 0 degrees to 180 degrees in the cycle of the reference clock CLKs in the Q1Q2 detection period, to be transferred to the electric charge accumulating sections 333. With this control, the quantities q1 of received light are accumulated in the electric charge accumulating sections 333.

Further, the row scanning circuit 310 causes electric charges, which are generated by the light receiving elements 331 in all the rows in response to the FD selection signals SEL_FD from 180 degrees to 360 degrees in the cycle of the reference clock CLKs in the Q1Q2 detection period, to be transferred to the electric charge accumulating sections 334. With this control, the quantities q2 of received light are accumulated in the electric charge accumulating sections 334.

Then, the row scanning circuit 310 supplies FD readout signals RD_FD1 and RD_FD2 to the first row in order at a timing T11 immediately before the timing T2. With this control, pixel signals based on the quantities Q1 and Q2 of received light in the first row are read out. Next, the row scanning circuit 310 supplies FD readout signals RD_FD1 and RD_FD2 to the second row in order and reads out pixel signals. Similarly to the above, the row scanning circuit 310 selects rows in order and reads out pixel signals.

In this way, each pixel circuit 330 detects the quantity Q1 of received light from 0 degrees to 180 degrees and the quantity Q2 of received light from 180 degrees to 360 degrees in the Q1Q2 detection period.

Figure 6:
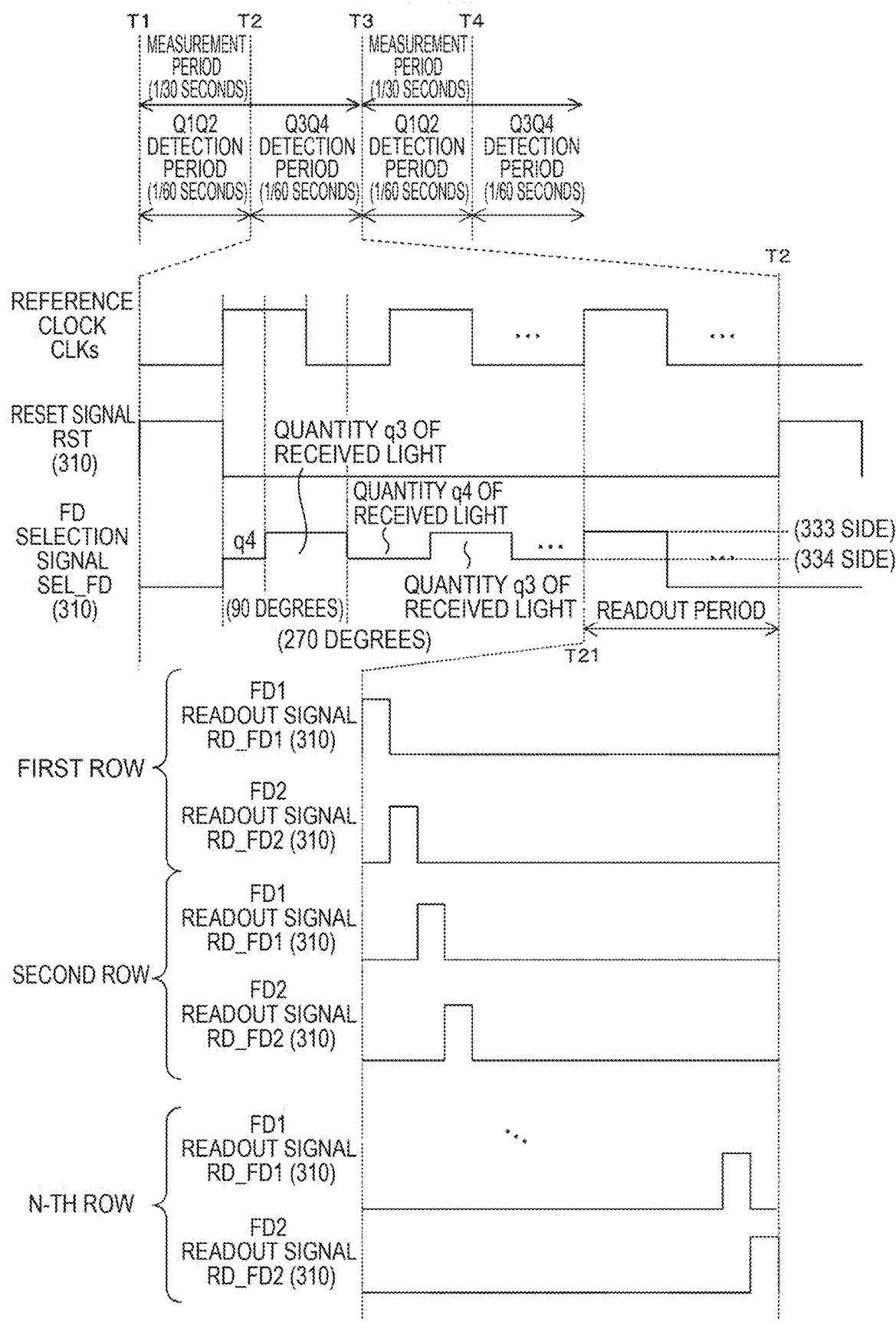
FIG. 6 is a timing chart showing an example of operation of a solid-state imaging element in a Q3Q4 detection period in the first embodiment of the present technology.

FIG. 6 is a timing chart showing an example of exposure control of the pixel circuit 330 in the Q3Q4 detection period in the first embodiment of the present technology. For example, the quantities Q3 and Q4 of received light are detected in the Q3Q4 detection period from the timing T2 to a timing T3. First, the row scanning circuit 310 supplies reset signals RST to all the rows over a predetermined pulse period from the timing T2 and initializes accumulation amounts of electric charges in the electric charge accumulating sections 333 and 334 in all the rows. Further, in response to FD selection signals SEL_FD, the row scanning circuit 310 initializes electric charges of the light receiving elements 331 in all the rows.

Then, the row scanning circuit 310 causes electric charges, which are generated by the light receiving elements 331 in all the rows in response to the FD selection signals SEL_FD from the first 0 degrees to 90 degrees, to be transferred to the electric charge accumulating sections 334. With this control, the quantities q4 of received light are accumulated in the electric charge accumulating sections 334. Then, the row scanning circuit 310 causes electric charges, which are generated by the light receiving elements 331 in all the rows in response to FD selection signals SEL_FD from 90 degrees to 270 degrees in the cycle of the reference clock CLKs, to be transferred to the electric charge accumulating sections 333. With this control, the quantities q3 of received light are accumulated in the electric charge accumulating sections 333.

Further, the row scanning circuit 310 causes electric charges, which are generated by the light receiving elements 331 in all the rows in response to the FD selection signals SEL_FD from 270 degrees to 90 degrees in the cycle of the reference clock CLKs in the Q3Q4 detection period, to be transferred to the electric charge accumulating sections 334. With this control, the quantities q4 of received light are accumulated in the electric charge accumulating sections 334.

Then, the row scanning circuit 310 supplies FD readout signals RD_FD1 and RD_FD2 to the first row in order at a timing T21 immediately before the timing T3. With this control, pixel signals based on the quantities Q3 and Q4 of received light in the first row are read out. Similarly to the above, the row scanning circuit 310 selects rows in order and reads out pixel signals.

In this way, each pixel circuit 330 detects the quantity Q3 of received light from 90 degrees to 270 degrees and the quantity Q4 of received light from 270 degrees to 90 degrees in the Q3Q4 detection period.

Figure 7:
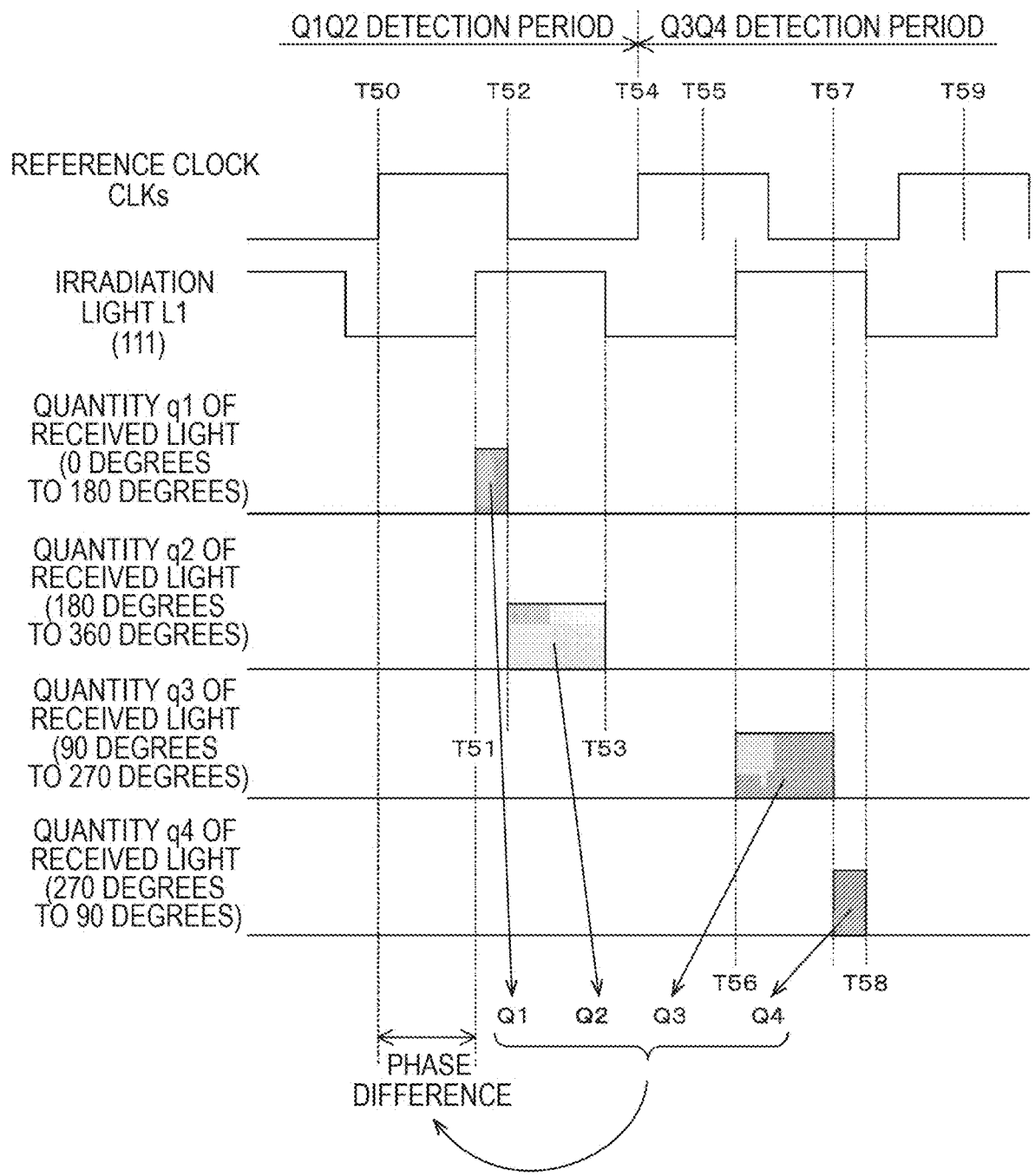
FIG. 7 is a diagram for describing a method of detecting a phase difference in the first embodiment of the present technology.

FIG. 7 is a diagram for describing a method of detecting a phase difference in the first embodiment of the present technology. The pixel circuit 330 transfers a quantity of received light from a timing T50 (0 degrees) to a timing T52 (180 degrees) in the Q1Q2 detection period to the electric charge accumulating section 333. In a case where the light source (e.g., the irradiation light sources 111 and 112) starts to emit light at a timing T51, a quantity of received light from the timing T51 to the timing T52 is transferred as the quantity q1 of received light.

Further, the pixel circuit 330 transfers a quantity of received light from the timing T52 (180 degrees) to a timing T54 (360 degrees) in the Q1Q2 detection period to the electric charge accumulating section 334. In a case where the light source terminates emission of light at a timing T53, a quantity of received light from the timing T52 to the timing T53 is transferred as the quantity q2 of received light.

Then, the pixel circuit 330 transfers a quantity of received light from a timing T55 (90 degrees) to a timing T57 (270 degrees) in the Q3Q4 detection period to the electric charge accumulating section 333. In a case where the light source starts to emit light at a timing T56, a quantity of received light from the timing T56 to the timing T57 is transferred as the quantity q3 of received light.

Further, the pixel circuit 330 transfers a quantity of received light from the timing T57 (270 degrees) to a timing T59 (90 degrees) in the Q3Q4 detection period to the electric charge accumulating section 334. In a case where the light source terminates emission of light at a timing T58, a quantity of received light from the timing T57 to the timing T58 is transferred as the quantity q4 of received light.

Then, accumulated values of the quantities q1 and q2 of received light in the Q1Q2 detection period are read out as the quantities Q1 and Q2 of received light, and accumulated values of the quantities q3 and q4 of received light in the Q3Q4 detection period are read out as the quantities Q3 and Q4 of received light. A ratio of a difference between Q1 and Q2 to a difference between Q3 and Q4 is a value based on a phase difference between the reference clock CLKs and the received light. Therefore, the distance measuring calculating section 230 can calculate the phase difference by using Expression 1.

Herein, the light source includes the irradiation light source 111 and the irradiation light source 112 as described above. Light from those two light sources is received by different pixel circuits 330 in the pixel array section 320. Therefore, the VR terminal 200 can individually detect phase differences between those two light beams and the reference clock CLKs. A phase difference between light from the irradiation light source 111 and the reference clock CLKs is denoted by "$dP_{1s}$", and a phase difference between light from the irradiation light source 112 and the reference clock CLKs is denoted by "$dP_{2s}$". A difference between those phase differences corresponds to the phase difference $dP_{12}$ between light from the irradiation light source 111 and light from the irradiation light source 112. In this way, the VR terminal 200 can detect the phase difference $dP_{12}$ between light from the irradiation light source 111 and light from the irradiation light source 112 by using a phase of the reference clock CLKs as a reference.

FIG. 8 is a diagram showing an example of a data configuration of image data in the first embodiment. This image data includes a plurality of pieces of pixel data. In the Q1Q2 detection period, each piece of the pixel data includes the quantities Q1 and Q2 of received light. Meanwhile, in the Q3Q4 detection period, each piece of the pixel data includes the quantities Q3 and Q4 of received light. For example, pixel data at coordinates (0, 0) in the Q1Q2 detection period includes the quantity Q1 of received light of "10" and the quantity Q2 of received light of "20". Further, pixel data at coordinates (0, 1) includes the quantity Q1 of received light of "10" and the quantity Q2 of received light of "20".

Figure 9:
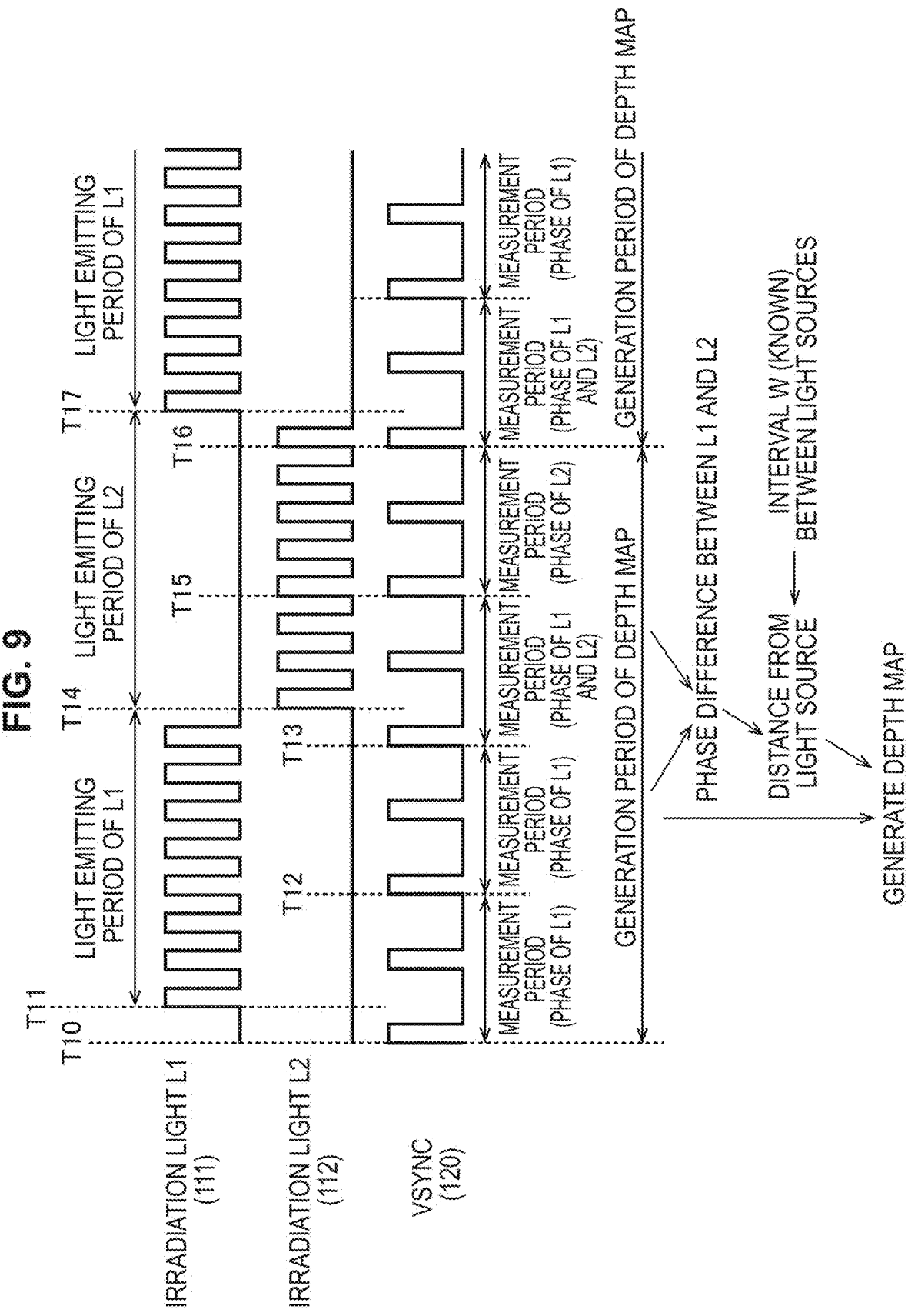
FIG. 9 is a timing chart showing an example of operation of an irradiation light source and a solid-state imaging element in the first embodiment of the present technology.

FIG. 9 is a timing chart showing an example of operation of the irradiation light source and the solid-state imaging element in the first embodiment of the present technology. Light emitted by the irradiation light source 111 is referred to as "irradiation light L1", and light emitted by the irradiation light source 112 is referred to as "irradiation light L2". As described above, those light sources emit light in synchronization with a common synchronization signal. Therefore, the irradiation light L1 and the irradiation light L2 have the same frequency, and a phase difference is 0 degrees at the time of irradiation. However, the phase difference between the irradiation light L1 and the irradiation light L2 is not necessarily the same at the time of receiving the light at which the VR terminal 200 receives the light. This is because distances from the irradiation light sources 111 and 112 to the VR terminal 200 are not necessarily the same. Further, the external device 110 repeats control that causes only the irradiation light source 111 to emit light for a certain period and control that causes only the irradiation light source 112 to emit light for a certain period. A length of this period in which one of the irradiation light sources is caused to emit light is set to time (e.g., $\frac{1}{15}$ seconds) which is longer than the measurement period.

For example, emission of the irradiation light L1 is started at a timing T11 in the measurement period from a timing T10 to a timing T12. Then, the irradiation light L1 is turned off and emission of the irradiation light L2 is started at a timing T14 immediately after the next measurement period from the timing T12 to a timing T13. Then, the irradiation light L2 is turned off and emission of the irradiation light L1 is started at a timing T17 at which the measurement period from the timing T13 to a timing T15 and the measurement period from the timing T15 to a timing T16 have elapsed.

As described above, the irradiation light sources 111 and 112 are caused to alternately emit light because a calculation amount is reduced in generation of a depth map. A reason why the calculation amount is reduced will be described below.

Only the irradiation light source 111 emits light from the timing T10 to the timing T13, and therefore the VR terminal 200 can detect a phase of the irradiation light L1 with respect to the reference clock CLKs. Further, the VR terminal 200 can also detect a phase of reflected light obtained by causing the irradiation light L1 to be reflected by an object on the basis of the reference clock CLKs.

Further, only the irradiation light source 111 emits light and then only the irradiation light source 112 emits light from the timing T13 to the timing T15, and therefore the VR terminal 200 can detect phases of the irradiation light L1 and the irradiation light L2 by using the reference clock CLKs. Only the irradiation light source 112 emits light from the timing T15 to the timing T16, and therefore the VR terminal 200 can detect a phase of the irradiation light L2 by using the reference clock CLKs.

Then, based on the detected phases of the irradiation light L1 and irradiation light L2, the VR terminal 200 detects the phase difference $dP_{12}$ therebetween. Then, the VR terminal 200 measures the distance $E_1$ from the irradiation light source 111 on the basis of the phase difference $dP_{12}$ and the known interval W between the irradiation light sources 111 and 112. After the distance $E_1$ is measured, the VR terminal 200 detects the phase difference $dP_{1d}$ between the irradiation light L1 and the reflected light of the irradiation light L1 and measures the distance Ed from a reflected light source that emits the reflected light on the basis of the known distance $E_1$ and the phase difference $dP_{1d}$. The distance measuring calculating section 230 measures the distance Ed from each of a plurality of reflected light sources and generates a depth map showing measurement results thereof. Also at and after the timing T17, the depth map is repeatedly generated at certain intervals (e.g., $\frac{2}{15}$ seconds) by a similar method.

[Configuration Example of Distance Measuring Calculating Section 230]

Figure 10:
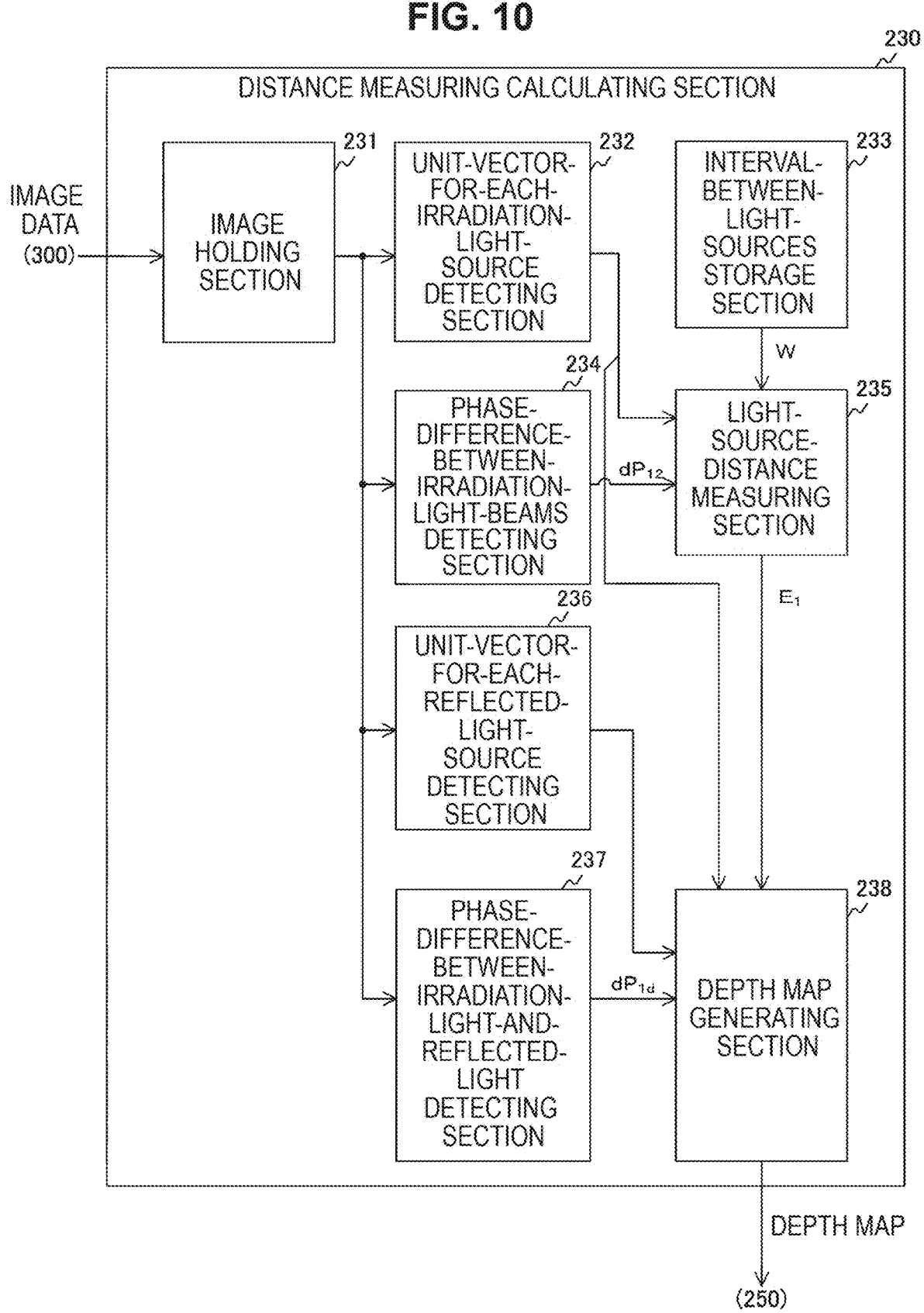
FIG. 10 is a block diagram showing a configuration example of a distance measuring calculating section in the first embodiment of the present technology.

FIG. 10 is a block diagram showing a configuration example of the distance measuring calculating section 230 in the first embodiment of the present technology. This distance measuring calculating section 230 includes an image holding section 231, a unit-vector-for-each-irradiation-light-source detecting section 232, an interval-between-light-sources storage section 233, a phase-difference-between-irradiation-light-beams detecting section 234, and a light-source-distance measuring section 235. Further, the distance measuring calculating section 230 includes a unit-vector-for-each-reflected-light-source detecting section 236, a phase-difference-between-irradiation-light-and-reflected-light detecting section 237, and a depth map generating section 238.

The image holding section 231 holds a predetermined number of pieces of image data. In a case where N frames are needed to generate a single depth map, at least (N−1) frames are held (in other words, buffered).

The unit-vector-for-each-irradiation-light-source detecting section 232 detects a unit vector for each of the irradiation light sources 111 and 112. Herein, the unit vector shows a direction from the VR terminal 200 to the irradiation light source 111 or 112 and is a vector having a length of "1". This unit-vector-for-each-irradiation-light-source detecting section 232 supplies the unit vector of each of the irradiation light sources 111 and 112 to the light-source-distance measuring section 235. Further, the unit vector of the irradiation light source 111 is also supplied to the depth map generating section 238.

The interval-between-light-sources storage section 233 stores the known interval W between the irradiation light sources 111 and 112.

The phase-difference-between-irradiation-light-beams detecting section 234 detects the phase difference $dP_{12}$ between light from the irradiation light source 111 and light from the irradiation light source 112. For example, the phase-difference-between-irradiation-light-beams detecting section 234 detects the phase difference $dP_{1s}$ between light from the irradiation light source 111 and the reference clock CLKs on the basis of the quantities Q1 to Q4 of received light of pixels corresponding to the irradiation light source 111. Further, the phase-difference-between-irradiation-light-beams detecting section 234 detects the phase difference $dP_{2s}$ between light from the irradiation light source 112 and the reference clock CLKs on the basis of the quantities Q1 to Q4 of received light of pixels corresponding to the irradiation light source 112. Then, the phase-difference-between-irradiation-light-beams detecting section 234 calculates a difference between those phase differences as the phase difference $dP_{12}$ and supplies the difference to the light-source-distance measuring section 235.

The light-source-distance measuring section 235 measures the distance $E_1$ from the irradiation light source 111 on the basis of the unit vector, the phase difference $dP_{12}$, and the known interval W.

Herein, the interval W between the irradiation light sources 111 and 112 is expressed by the following expression with the use of the vectors from the VR terminal 200 to the respective irradiation light sources 111 and 112.

[Math. 1]

$$W = |\vec{E}_2 - \vec{E}_1| \quad \text{Expression 2}$$

In the above expression, the symbol "$E_1$" having an arrow denotes the vector from the VR terminal 200 to the irradiation light source 111, the symbol "$E_2$" having an arrow denotes the vector from the VR terminal 200 to the irradiation light source 112. Further, the unit of the interval W is, for example, meter.

Further, when a difference between the distance $E_1$ from the VR terminal 200 to the irradiation light source 111 and the distance $E_2$ from the VR terminal 200 to the irradiation light source 111 is denoted by "$dE_{12}$", the following expression is satisfied.

$$dE_{12} = E_2 - E_1 \quad \text{Expression 3}$$

Further, the following expression is satisfied on the basis of the law of cosines.

$$W^2 = E_1^2 + E_2^2 - 2E_1 \cdot E_2 \cdot \cos R \quad \text{Expression 4}$$

In the above expression, the symbol "R" denotes an angle between the unit vector to the irradiation light source 111 and the unit vector to the irradiation light source 112. The unit of this angle R is, for example, radian. Further, the units of the distances $E_1$ and $E_2$ are, for example, meter (m).

When the distance $E_2$ is replaced with an additional value of the distance $E_1$ and the difference $dE_{12}$ by using Expression 3, the additional value is substituted for Expression 4, and the resultant expression is deformed, the following expression is obtained.

[Math. 2]

$$E_1 = \frac{1}{2}\left(\sqrt{\frac{2W^2 - dE^2(1 + \cos R)}{1 - \cos R}} - dE_{12}\right) \quad \text{Expression 5}$$

Further, when the distance $E_1$ is replaced with a difference between the distance $E_2$ and the difference $dE_{12}$ by using Expression 3, the additional value is substituted for Expression 4, and the resultant expression is deformed, the following expression is obtained.

[Math. 3]

$$E_2 = \frac{1}{2}\left(\sqrt{\frac{2W^2 - dE^2(1 + \cos R)}{1 - \cos R}} + dE_{12}\right) \quad \text{Expression 6}$$

Further, the following expression is obtained on the basis of a formula regarding an inner product of a vector.

[Math. 4]

$$\cos R = \frac{\vec{e}_1 \cdot \vec{e}_2}{|\vec{e}_1| \cdot |\vec{e}_2|} = \vec{e}_1 \cdot \vec{e}_2 \quad \text{Expression 7}$$

Further, the distance $E_1$ and the distance $E_2$ can also be expressed by the following expressions on the basis of a principle of ToF.

$$E_1 = c \cdot \{P(E_1) - P(u_1)\}/(2\pi f) \quad \text{Expression 8}$$

$$E_2 = c \cdot \{P(E_2) - P(u_2)\}/(2\pi f) \quad \text{Expression 9}$$

In the above expression, the symbol "c" denotes a speed of light, and the unit thereof is, for example, second per meter (m/s). The symbol "$\pi$" denotes a ratio of a circumference of a circle to its diameter. Further, the symbol "f" denotes a frequency of irradiation light, and the unit thereof is, for example, megahertz (MHz). The symbol "$P(E_1)$" denotes a phase of the irradiation light L1 emitted by the irradiation light source 111 at the time of irradiation, and the symbol "$P(u_1)$" denotes a phase of the irradiation light L1 at the time of receiving the light. The symbol "$P(E_2)$" denotes a phase of the irradiation light L2 emitted by the irradiation light source 112 at the time of irradiation, and the symbol "$P(u_2)$" denotes a phase of the irradiation light L2 at the time of receiving the light. The units of those phases are, for example, radian.

The phases $P(E_1)$ and $P(E_2)$ at the time of irradiation are unknown, and therefore the distances $E_1$ and $E_2$ cannot be directly obtained by using only Expression 8 and Expression 9. However, as described above, the phases $P(E_1)$ and $P(E_2)$ at the time of irradiation have the same value, and therefore the $P(E_1)$ and $P(E_2)$ are deleted from Expression 8 and Expression 9. Thus, the following expression is obtained.

$$dE_{12} = E_2 - E_1 \quad \text{Expression 10}$$
$$= c \cdot \{P(u_1) - P(u_2)\}/(2\pi f)$$
$$= c \cdot dP_{12}/(2\pi f)$$

In a case where two sides of a triangle whose three sides have lengths of $E_1$, $E_2$, and W are found, the remaining one side can be calculated by using Expression 5 and Expression 6 on the basis of the law of cosines. However, only W is known. Therefore, the remaining lengths $E_1$ and $E_2$ cannot be calculated by using only Expression 5 and Expression 6. However, Expression 10 is further obtained according to a ToF method, and therefore it is possible to calculate $E_1$ and $E_2$ by solving simultaneous equations.

The light-source-distance measuring section 235 substitutes the detected phase difference $dP_{12}$ for Expression 10 to calculate the difference $dE_{12}$ and substitutes the detected unit vector for Expression 7 to calculate cos R. Then, the phase-difference-between-irradiation-light-beams detecting section 234 substitutes the calculated difference $dE_{12}$ and cos R and the known interval W for Expression 5 to calculate the distance $E_1$ and supplies the distance $E_1$ to the depth map generating section 238. Note that the phase-difference-between-irradiation-light-beams detecting section 234 may calculate distance $E_2$ by using Expression 6, instead of the distance $E_1$, or may calculate both the distances $E_1$ and $E_2$.

The unit-vector-for-each-reflected-light-source detecting section 236 detects a unit vector for each of a predetermined number of reflected light sources that reflect irradiation light from the irradiation light source 111. The unit-vector-for-each-reflected-light-source detecting section 236 supplies each of the calculated unit vectors to the depth map generating section 238.

The phase-difference-between-irradiation-light-and-reflected-light detecting section 237 detects, for each reflected light source, a phase difference between reflected light from the reflected light source and irradiation light from the irradiation light source 111. The phase-difference-between-irradiation-light-and-reflected-light detecting section 237 calculates the phase difference $dP_{1d}$ for each reflected light source by a method similar to that of the phase-difference-between-irradiation-light-beams detecting section 234 and supplies the phase difference $dP_{1d}$ to the depth map generating section 238. Note that both the phase-difference-between-irradiation-light-beams detecting section 234 and the phase-difference-between-irradiation-light-and-reflected-light detecting section 237 are examples of a phase difference detecting section recited in CLAIMS.

The depth map generating section 238 generates a depth map showing a distance from the reflected light source for each reflected light source. A difference dD between a direct distance $E_1$ from the irradiation light source 111 not via the reflected light source and a distance from the irradiation light source 111 via the reflected light source is expressed by the following expression.

[Math. 5]

$$|\vec{E_1 D}| + D - E_1 = dD \qquad \text{Expression 11}$$

In the above expression, the symbol "$E_1 D$" having an arrow denotes a vector showing a direction from the irradiation light source 111 to the reflected light source. Further, the symbol "D" denotes a direct distance from the VR terminal 200 to the reflected light source, and the unit thereof is, for example, meter (m).

The distance D can be expressed by the following expression on the basis of Expression 11 and the law of cosines.

$$D = dD(dD + 2E_1) / \{2dD + 2E_1(1 - \cos A)\} \qquad \text{Expression 12}$$

In the above expression, the symbol "A" denotes an angle between the unit vector to the irradiation light source 111 and a unit vector to the reflected light source. The unit of the angle A is, for example, radian.

Further, the following expression is obtained on the basis of the formula regarding an inner product of a vector.

[Math. 6]

$$\cos A = \frac{\vec{e_1} \cdot \vec{d}}{|\vec{e_1}| \cdot |\vec{d}|} = \vec{e_1} \cdot \vec{d} \qquad \text{Expression 13}$$

In the above expression, the symbol "d" having an arrow denotes the unit vector of the reflected light source.

Further, the difference dD can also be expressed by the following expression on the basis of the principle of ToF.

$$dD = c \cdot \{P(u_1) - P(uD)\} / (2\pi f) \qquad \text{Expression 14}$$
$$= c \cdot dP_{1d} / (2\pi f)$$

In the above expression, the symbol "$P(u_1)$" denotes a phase of irradiation light from the irradiation light source 111 at the time of receiving the light. The symbol "P(uD)" denotes a phase of reflected light from the reflected light source at the time of receiving the light.

The depth map generating section 238 substitutes the detected phase difference $dP_{1d}$ for Expression 14 to calculate the difference dD and substitutes the detected vector for Expression 13 to calculate cos A. Then, the depth map generating section 238 substitutes the calculated difference dD and cos A and the known distance $E_1$ for Expression 12 to calculate the distance D. The depth map generating section 238 calculates the distance D for each irradiation light source, generates a depth map, and supplies the depth map to the terminal control section 250. Note that both the light-source-distance measuring section 235 and the depth map generating section 238 are examples of a distance measuring section recited in CLAIMS.

Note that the light-source-distance measuring section 235 performs calculation by assuming that the phases $P(E_1)$ and $P(E_2)$ at the time of irradiation have the same value (i.e., the phase difference is "0"). However, those phases may have different values. Note that the phase difference is known. In a case where the phase difference is not "0", calculation may be performed by using an expression obtained by adding or subtracting the phase difference to or from $dP_{12}$ of Expression 10.

Figure 11:
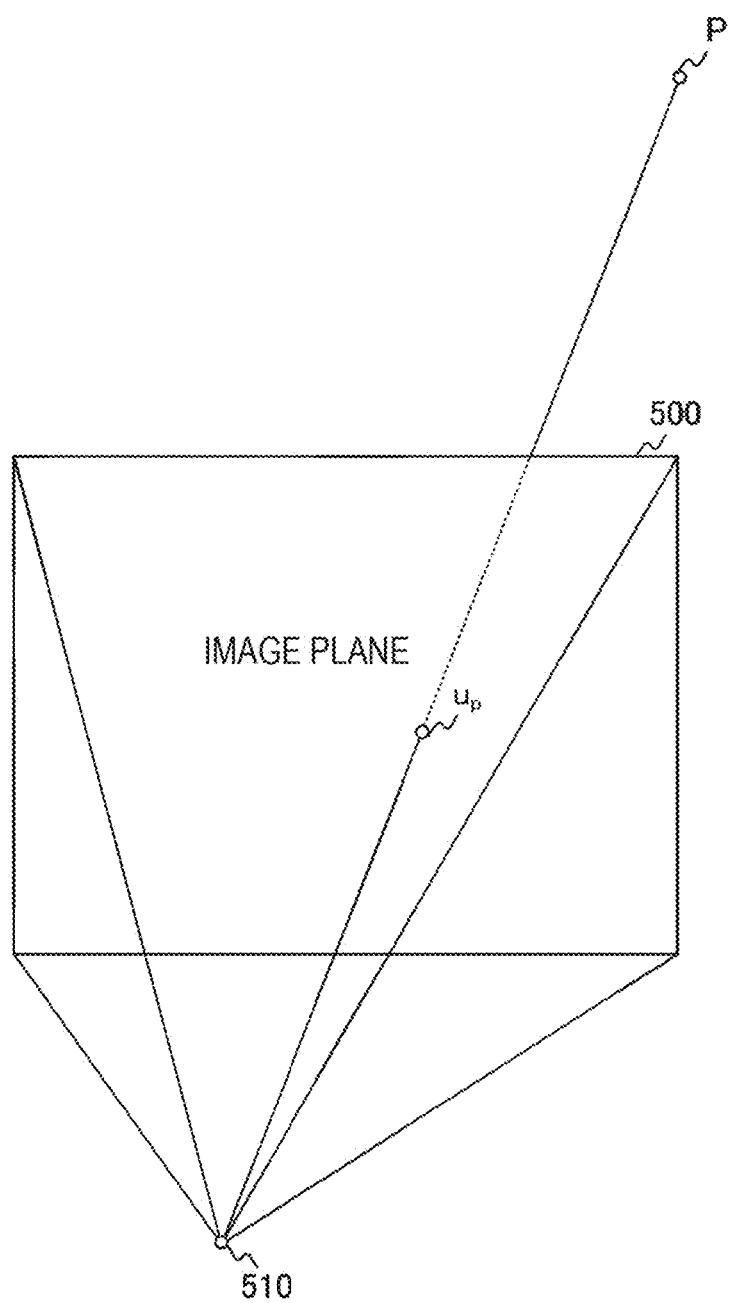
FIG. 11 is a diagram for describing a method of detecting a unit vector in the first embodiment of the present technology.

FIG. 11 is a diagram for describing a method of detecting a unit vector in the first embodiment of the present technology. Generally, onto which coordinates in an image a point in a three dimension is projected can be estimated by obtaining a parameter inherent to a camera (e.g., the VR terminal 200) or the imaging lens 220 in advance.

For example, coordinates (three-dimensional coordinates) of a certain point P in a coordinate system around the camera are set to (x_P, y_P, z_P), and coordinates (plane coordinates) of a point $U_P$ on an image onto which the point P is projected are set to (U_P, V_P).

The coordinates of this point P can be converted into coordinates of the corresponding point $U_P$ by using an internal parameter matrix. On the contrary, in a case where the coordinates of the point $U_P$ are given, a position of the point P cannot be obtained by using the internal parameter matrix. However, the point P is positioned on a straight line along a direction from an optical center 510 to the point $U_P$, and therefore the VR terminal 200 can detect a unit vector showing a direction from the optical center 510 to the point P on the basis of the coordinates of the point $U_P$.

FIG. 12 is diagrams showing examples of image data in the first embodiment of the present technology. The drawing a in FIG. 12 shows an example of image data 501 captured in a period in which only the irradiation light source 111 emits light. Further, the drawing b in FIG. 12 shows an example of image data 502 captured in a period in which only the irradiation light source 112 emits light.

The VR terminal 200 extracts, for example, a pixel having the highest luminance in the image data as a pixel that receives light of the irradiation light source (111 or 112). Then, the VR terminal 200 detects the unit vector from the irradiation light source on the basis of coordinates of the extracted pixel.

Figure 13:
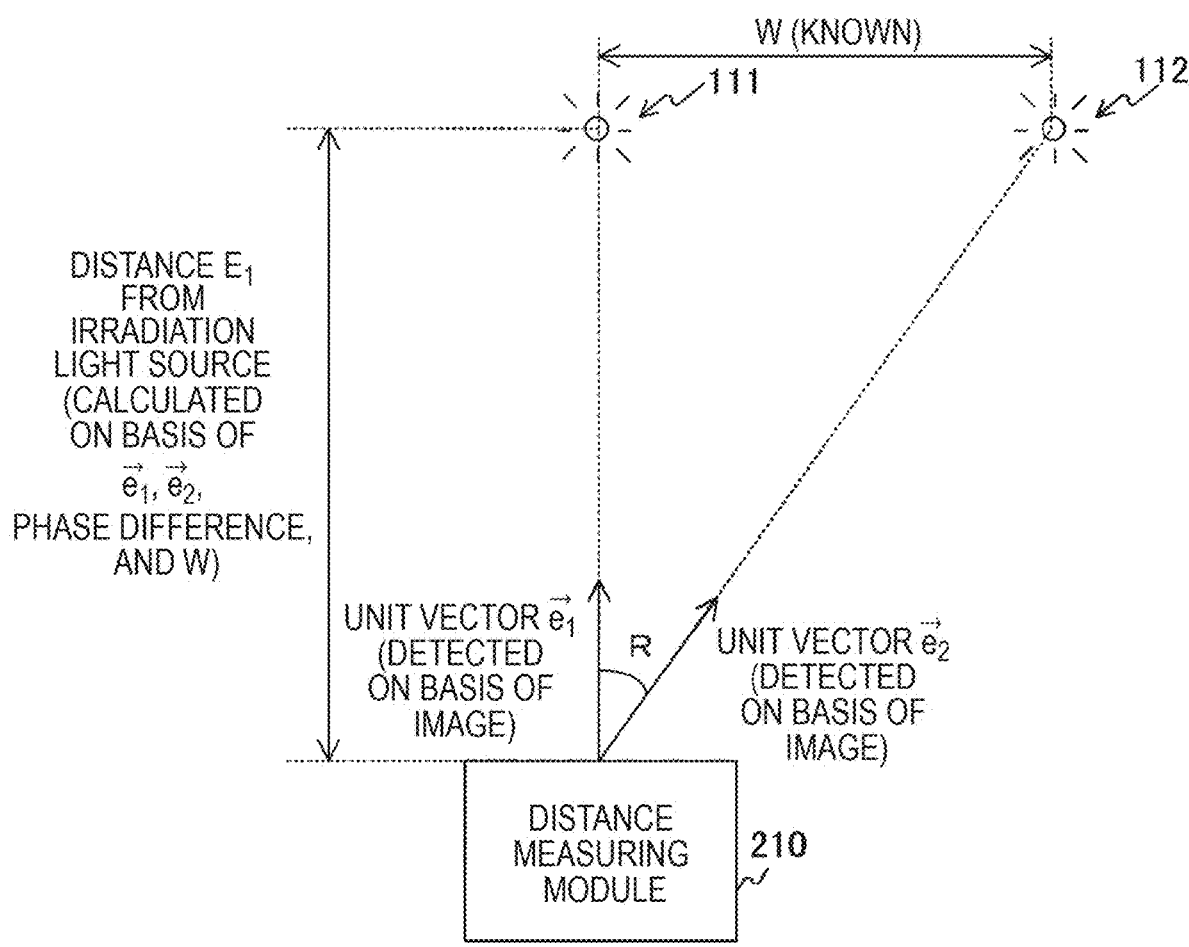
FIG. 13 is a diagram for describing a method of measuring a distance from an irradiation light source in the first embodiment of the present technology.

FIG. 13 is a diagram for describing a method of measuring the distance $E_1$ from the irradiation light source 111 in the first embodiment of the present technology. The distance measuring module 210 captures image data when the irradiation light source 111 emits light and detects the unit vector showing the direction from the irradiation light source 111 on the basis of coordinates of the irradiation light source 111 in the image data. Then, the distance measuring module 210 also detects the unit vector of the irradiation light source 112 by a similar method.

Further, the distance measuring module 210 detects the phase difference $dP_{12}$ between light from the irradiation light source 111 and light from the irradiation light source 112 by using Expression 1. Then, the distance measuring module 210 substitutes the detected unit vectors and phase difference $dP_{12}$ and the known interval W for Expression 5, Expression 7, and Expression 10 described above to measure the distance $E_1$ from the irradiation light source 111.

Note that the VR terminal 200 measures the distance $E_1$ on the basis of the phase difference between light beams from the irradiation light sources 111 and 112. However, the distance $E_1$ may be measured by using another method. For example, a position of a device in which the distance measuring module 210 is provided may be fixed and the distance $E_1$ may be measured by another measuring device in advance. In this case, a depth map is generated by using the known distance $E_1$.

Further, the VR terminal 200 measures the distance by using the phase difference of light on the basis of the principle of the ToF method. However, the distance may be measured on the basis of a principle of flash light detection and ranging, laser imaging detection and ranging (LIDAR). In the ToF method in which a phase is modulated, phase information is converted into transmission time of light and is further converted into distance information to obtain the distance. However, in a case of flash LIDAR, it is possible to directly measure the transmission time of light.

Further, in a case where no external light source (e.g., the irradiation light sources 111 and 112) appears in the image data, the VR terminal 200 cannot measure a distance. However, even in that case, the VR terminal 200 may buffer a predetermined number of pieces of image data and estimate a current position of the external light source on the basis of the past position of the external light source in the pieces of image data.

Further, the VR terminal 200 may estimate the own position at the same time as a depth map is generated. Such processing is referred to as "simultaneous localization and mapping (SLAM)". In order to estimate the own position, for example, the VR terminal 200 only needs to store spatial coordinates of the irradiation light sources 111 and 112 in advance and estimate the own position on the basis of directions and distances of those light sources.

Figure 14:
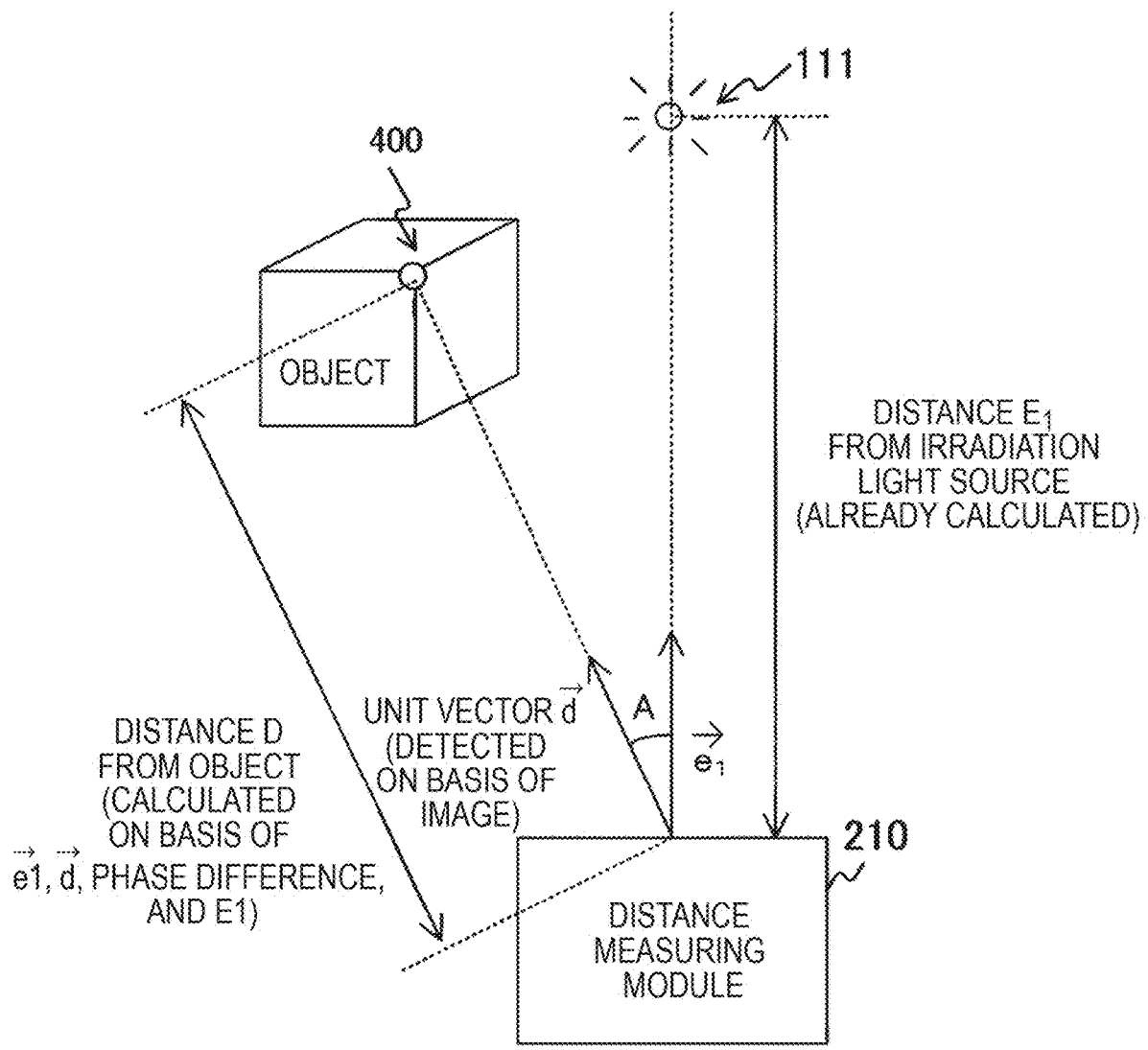
FIG. 14 is a diagram for describing a method of measuring a distance from an object in the first embodiment of the present technology.

FIG. 14 is a diagram for describing a method of measuring the distance D from an object in the first embodiment of the present technology. The distance measuring module 210 captures image data when the irradiation light source 111 emits light and detects a unit vector showing a direction from a reflected light source 400 in the image data on the basis of coordinates of the reflected light source.

Further, the distance measuring module 210 detects the phase difference $dP_{1d}$ between light from the irradiation light source 111 and light from the reflected light source by using Expression 1. Then, the distance measuring module 210 substitutes the detected unit vector and phase difference $dP_{1d}$ and the known distance $E_1$ that has already been calculated for Expression 12 to Expression 14 described above to measure the distance D from the reflected light source (object) 400.

Herein, in a case where the irradiation light source 111 and the irradiation light source 112 are simultaneously turned on when the distance D is measured, both irradiation light of the irradiation light source 111 and irradiation light of the irradiation light source 112 are reflected by the object. Therefore, it is necessary to calculate the distance D by using light obtained by overlapping those two light beams as reflected light. As a result, calculation of the distance D is complicated, as compared to a case where only a single irradiation light source is turned on. Therefore, the external device 110 alternately turns on the irradiation light sources 111 and 112 in view of simplifying calculation of the distance D. Note that, in a case where the complicated calculation is allowed, the irradiation light sources 111 and 112 may be simultaneously turned on. In a case where a pair of external light sources may be simultaneously turned on, for example, a pair of ceiling lights may be used, instead of the irradiation light sources 111 and 112.

As described with reference to FIGS. 13 and 14, the distance measuring module 210 focuses on a pair of external light sources such as reflected light sources or irradiation light sources and detects a phase difference between light beams from those external light sources. Then, in a case where any one of the interval W between the pair of external light sources and the distance (e.g., $E_1$) from one of the external light sources is known, the distance measuring module 210 can measure a distance ($E_1$ or $E_2$) from the other thereof on the basis of the known data and the detected phase difference. In the example of FIG. 13, both the two external light sources are irradiation light sources and a distance ($E_1$ or $E_2$) from any one of those irradiation light sources is measured on the basis of the interval W that is known data. The distances $E_1$ and $E_2$ in FIG. 13 are examples of a "distance from the other of the pair of external light sources" in CLAIMS. Meanwhile, in the example of FIG. 14, one of the two external light sources is an irradiation light source and the other thereof is a reflected light source and the distance D from the other (reflected light source) is measured on the basis of the distance ($E_1$ or $E_2$) from the one (irradiation light source) which is known data. The distance D in FIG. 14 is an example of a "distance from the other of the pair of external light sources" in CLAIMS.

As described above, the VR terminal 200 measures a distance by using a phase difference between light beams from external light sources and therefore does not need to include a light emitting element such as a light emitting diode inside. With this, it is possible to reduce power consumption to be supplied to the light emitting element. Further, it is unnecessary to transmit and reflect light, and light directly transmitted to a camera from the light sources is not absorbed by the object. Therefore, a quantity of received light is increased, as compared to a general ToF method of irradiating an object with irradiation light and receiving reflected light. With this, it is possible to improve distance measuring accuracy, as compared to the method of receiving reflected light.

Figure 15:
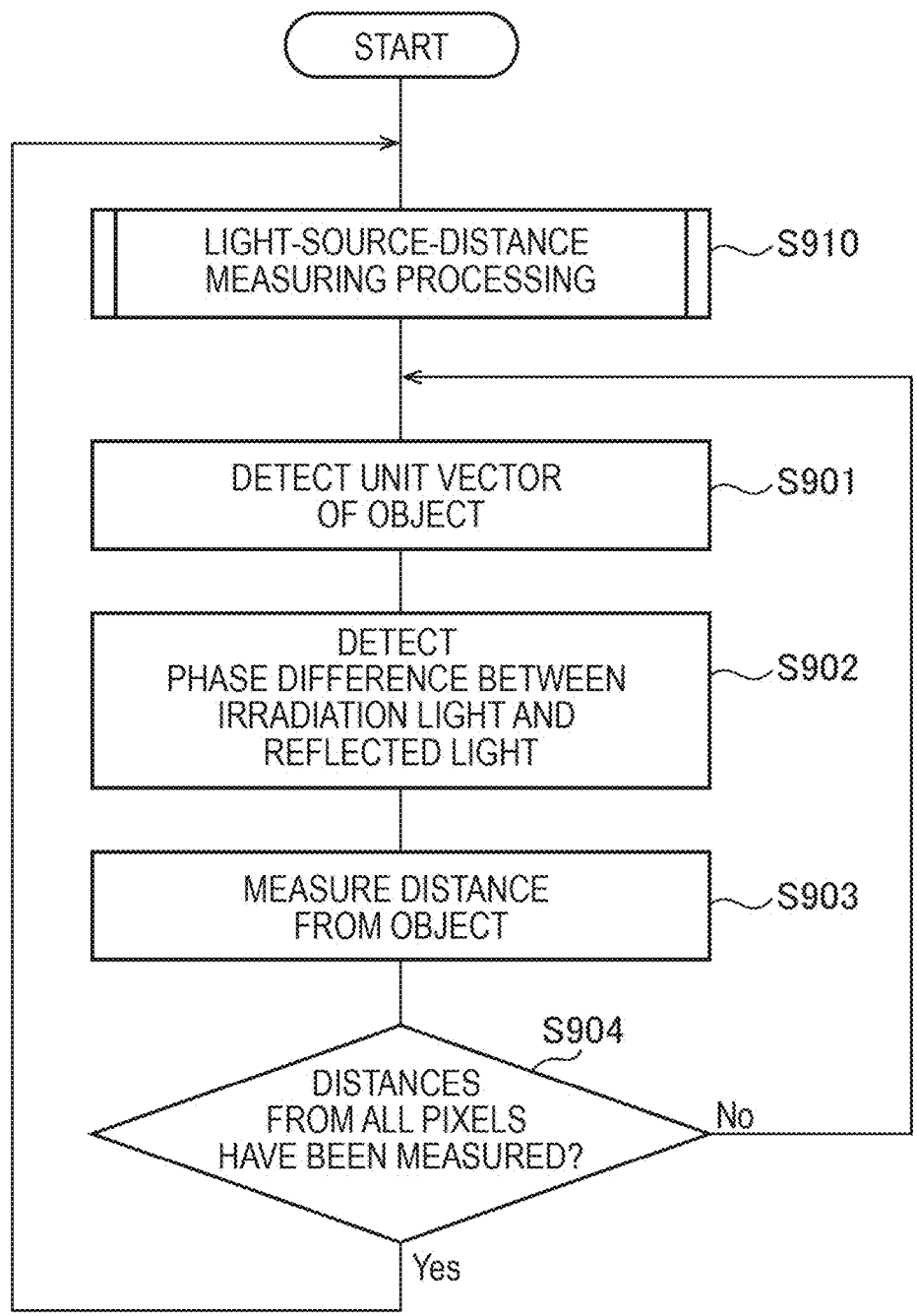
FIG. 15 is a flowchart showing an example of operation of a distance measuring module in the first embodiment of the present technology.

FIG. 15 is a flowchart showing an example of operation of the distance measuring module 210 in the first embodiment of the present technology. This operation is started when, for example, power is supplied to the VR terminal 200 or a predetermined application for processing a depth map is executed. The distance measuring module 210 first executes light-source-distance measuring processing for measuring a distance $E_1$ from the irradiation light source 111 (Step S910). Then, the distance measuring module 210 focuses on any one of a predetermined number of pixels serving as targets to be measured. The distance measuring module 210 detects a unit vector of an object appearing in a target pixel (Step S901). Further, the distance measuring module 210 detects a phase difference between irradiation light and reflected light obtained by causing the irradiation light to be reflected by the object (Step S902).

Then, the distance measuring module 210 measures a distance D from the object on the basis of the detected unit vector and phase difference and the known distance $E_1$ (Step S903). The distance measuring module 210 determines whether or not distances from all the pixels serving as targets to be measured have been measured (Step S904). In a case where the distances from all the pixels have not been measured (Step S904: No), the distance measuring module 210 repeatedly executes Step S901 and the steps subsequent to Step S901. On the contrary, in a case where the distances from all the pixels serving as targets whose distances are to be measured have been measured (Step S904: Yes), the distance measuring module 210 repeatedly executes Step S910 and the steps subsequent to Step S910.

Figure 16:
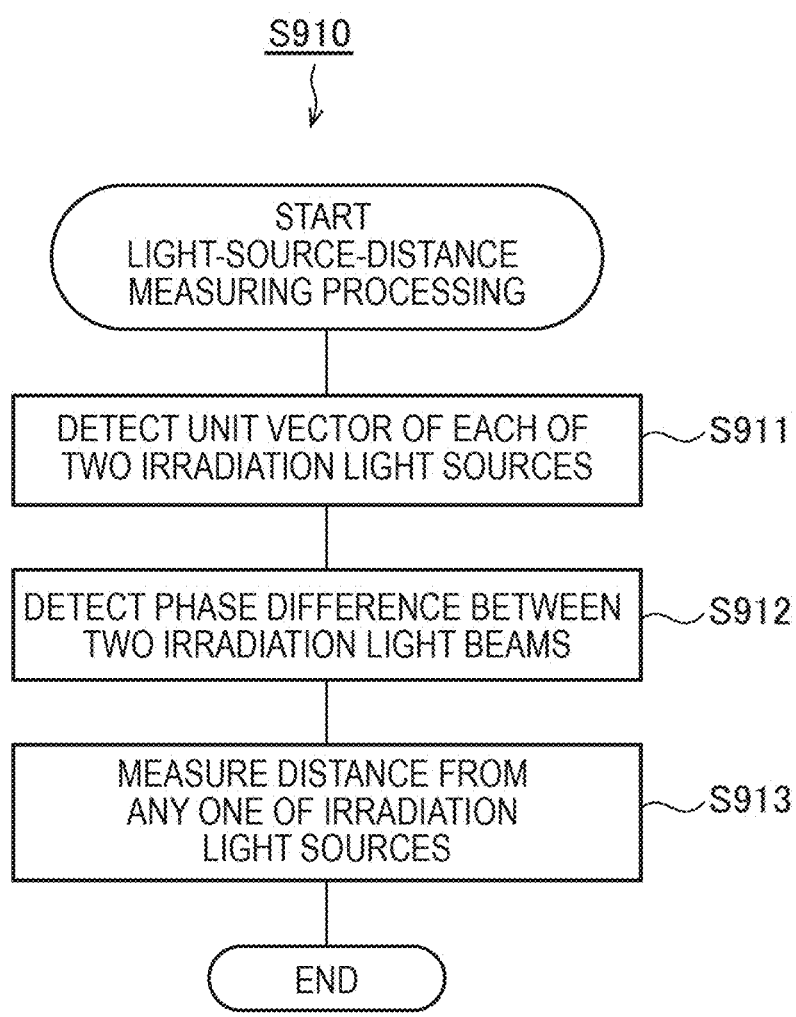
FIG. 16 is a flowchart showing an example of light-source-distance calculation processing in the first embodiment of the present technology.

FIG. 16 is a flowchart showing an example of light-source-distance measuring processing in the first embodiment of the present technology. The distance measuring module 210 detects a unit vector of each of two irradiation light sources (e.g., 111 and 112) (Step S911). Further, the distance measuring module 210 detects a phase difference between irradiation light beams of the two irradiation light sources (Step S912). Then, the distance measuring module 210 measures a distance (e.g., $E_1$) from any one of the irradiation light sources on the basis of the detected unit vector and phase difference and the known interval W (Step S913). After Step S913, the distance measuring module 210 terminates light-source-distance calculation processing.

As described above, according to the first embodiment of the present technology, the VR terminal 200 measures a distance from one of a pair of external light sources, such as the irradiation light sources 111 and 112 and the irradiation light source 111 and the reflected light source, on the basis of a phase difference between light beams from the pair of external light sources and therefore does not need to include a light emitting element inside. With this, it is possible to reduce power consumption to be supplied to the light emitting element.

First Modification Example

In the above-described first embodiment, the VR terminal 200 measures the distance $E_1$ from the irradiation light source 111 on the basis of a phase difference between the irradiation light sources 111 and 112 that are alternately turned on. However, only light sources that continuously emit light exist in some cases. In such a case, for example, it is possible to measure distances from a plurality of external light sources whose spatial coordinates are known on the basis of projected points of those external light sources. This VR terminal 200 in a first modification example of the first embodiment is different from that of the first embodiment in that distances from a plurality of external light sources are measured on the basis of coordinates of projected points of those light sources.

Figure 17:
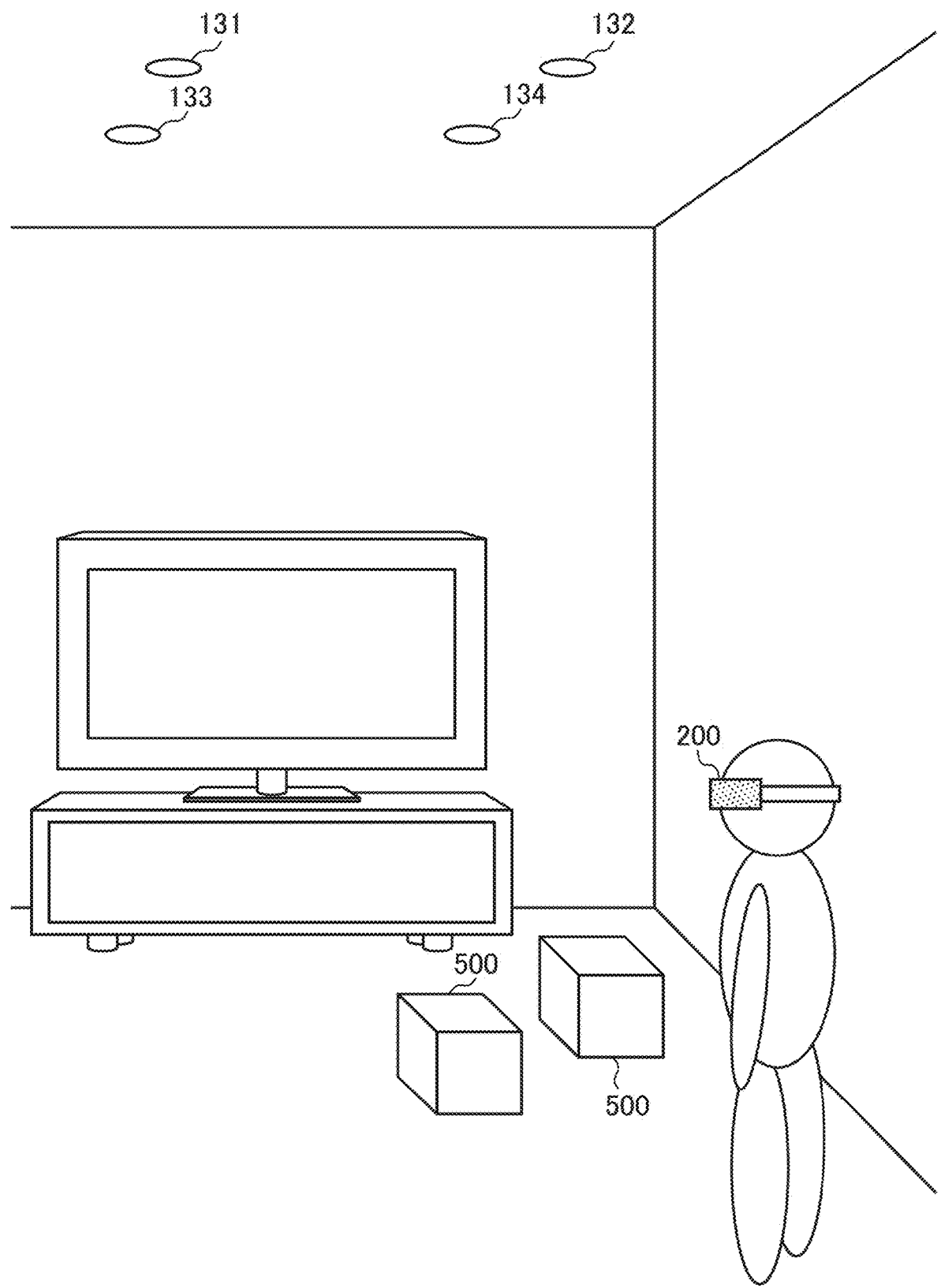
FIG. 17 is a general view showing an example of a distance measuring system in a first modification example of the first embodiment of the present technology.

FIG. 17 is a general view showing an example of a distance measuring system in the first modification example of the first embodiment of the present technology. This distance measuring system in the first modification example of the first embodiment is different from that of the first embodiment in that ceiling lights 131 to 134 are used as external light sources, instead of the irradiation light sources 111 and 112 provided in the external device 110.

The ceiling lights 131 to 134 are arranged at respective four vertices of a predetermined square. Spatial coordinates of those lights are stored on the VR terminal 200 in advance. The VR terminal 200 measures distances by using those spatial coordinates. Note that a figure having the ceiling lights 131 to 134 as vertices is not limited to a square and may be a rectangle, a trapezoid, or the like.

Figure 18:
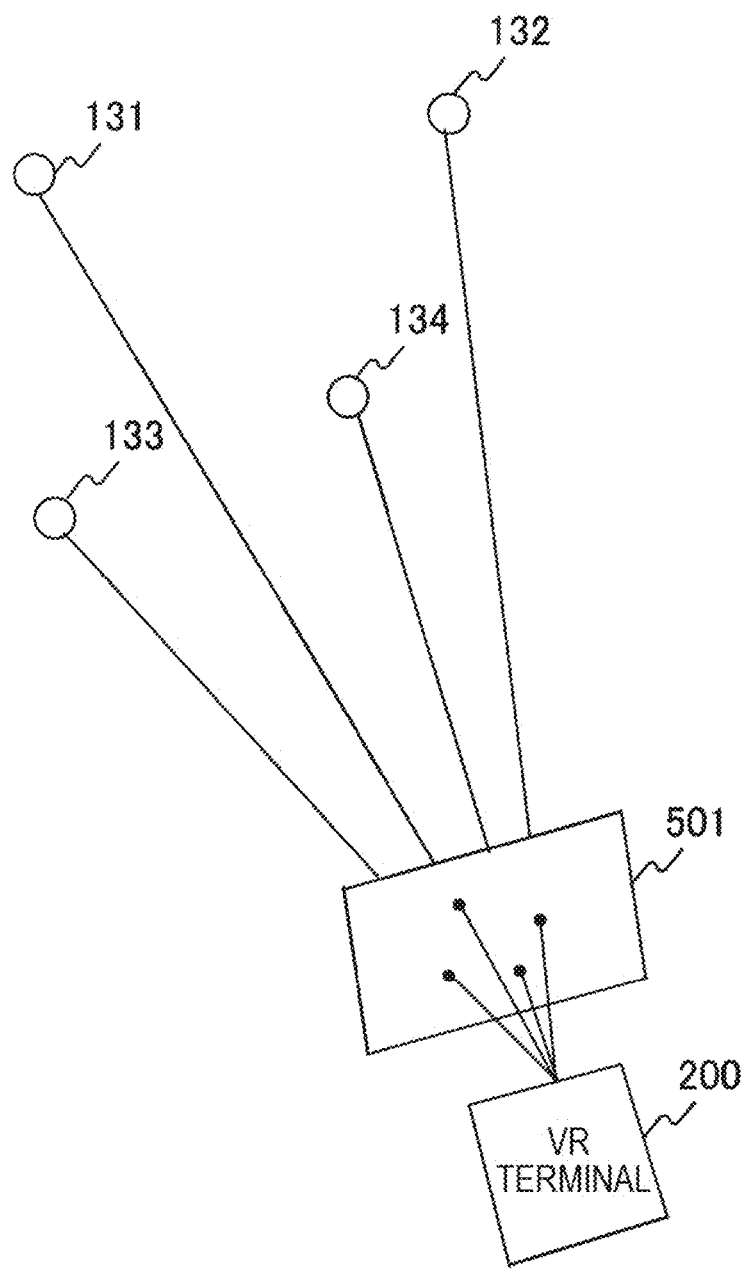
FIG. 18 is a diagram for describing a method of measuring a distance in the first modification example of the first embodiment of the present technology.

FIG. 18 is a diagram for describing a method of measuring a distance in the first modification example of the first embodiment of the present technology. The ceiling lights 131 to 134 are projected onto projected points $u_1$ to $u_4$ on a predetermined imaging plane. Positions of the ceiling lights 131 to 134 are not changed, whereas a position and posture of the VR terminal 200 may be changed. Therefore, plane coordinates of the projected points $u_1$ to $u_4$ are changed in accordance with the position and posture of the VR terminal 200. The coordinates of the projected points $u_1$ to $u_4$ and the position and posture have a certain relationship, and therefore the VR terminal 200 can calculate the own position and posture by inputting the plane coordinates of the projected point $u_1$ to $u_4$ to a function showing the relationship. When the position of the VR terminal 200 is calculated, the VR terminal 200 can calculate distances from those lights on the basis of the own position because the positions of the ceiling lights 131 to 134 are fixed.

As described above, a problem of obtaining a position and posture of a camera (the VR terminal 200) on the basis of known spatial points (e.g., the ceiling lights 131 to 134) and projected points thereof is referred to as "perspective-n-pont (PnP) problem". This PnP problem is disclosed in, for example, "Digital image processing' edited by Okutomi Masatoshi, revised edition, computer graphic arts society, March 2006, pp. 328-331".

Note that the VR terminal 200 uses the projected points of the ceiling lights 131 to 134. However, it is possible to use projected points of light sources other than ceiling lights as long as the light sources are external light sources whose positions are known.

Figure 19:
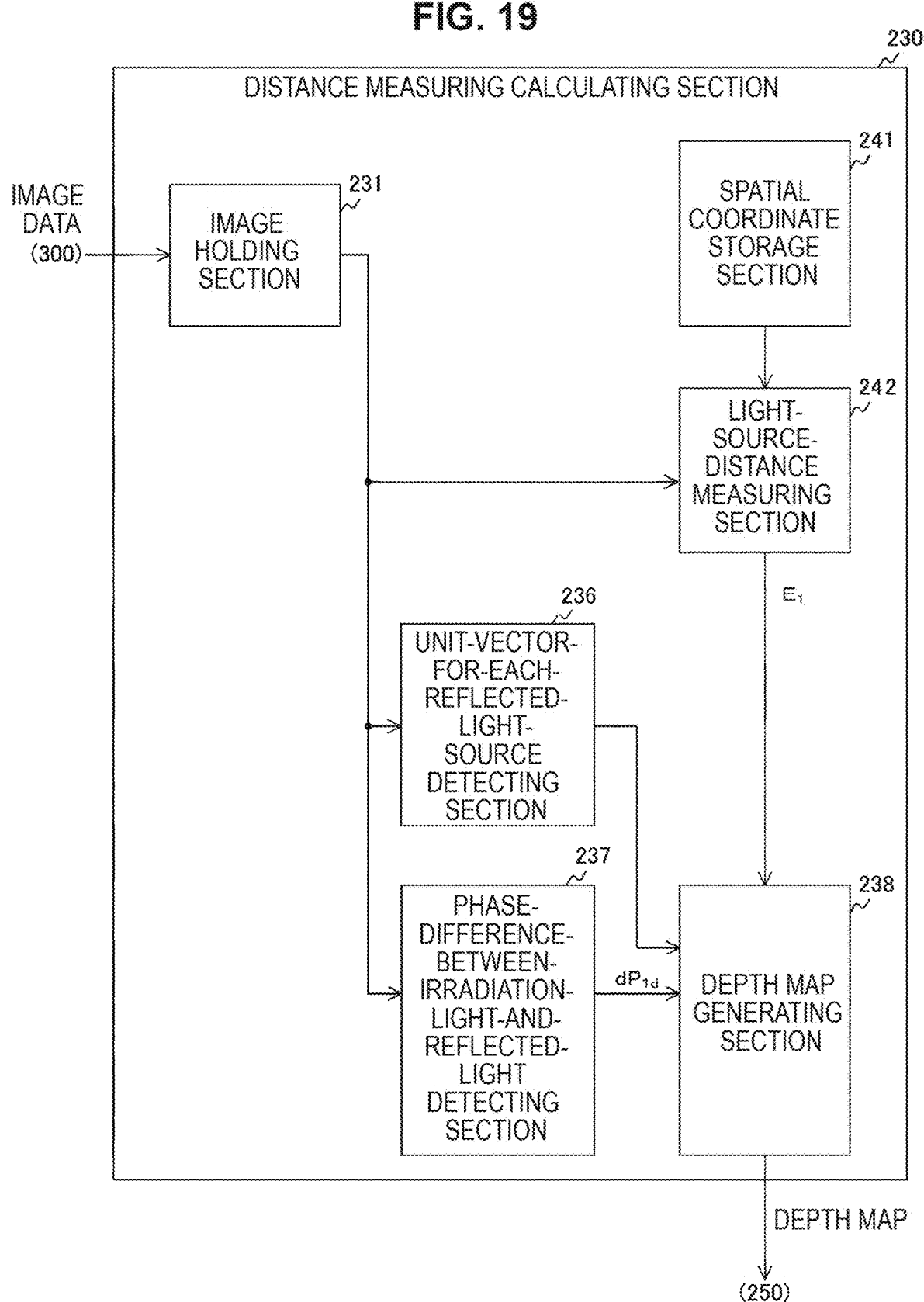
FIG. 19 is a block diagram showing a configuration example of a distance measuring calculating section in the first modification example of the first embodiment of the present technology.

FIG. 19 is a block diagram showing a configuration example of the distance measuring calculating section 230 in the first modification example of the first embodiment of the present technology. This distance measuring calculating section 230 in the first modification example of the first embodiment does not include the unit-vector-for-each-irradiation-light-source detecting section 232, the interval-between-light-sources storage section 233, the phase-difference-between-irradiation-light-beams detecting section 234, and the light-source-distance measuring section 235. The distance measuring calculating section 230 includes a spatial coordinate storage section 241 and a light-source-distance measuring section 242, instead of the above sections.

The spatial coordinate storage section 241 stores spatial coordinates of the respective ceiling lights 131 to 134. The light-source-distance measuring section 242 acquires plane coordinates of projected points of the respective ceiling lights 131 to 134 on the basis of image data. Then, the light-source-distance measuring section 242 solves the PnP problem to calculate a position of the VR terminal 200 and obtains, on the basis of the position, a unit vector showing a direction to any one (e.g., the ceiling light 131) of the ceiling lights 131 to 134 and a distance $E_1$ from the light. The light-source-distance measuring section 242 supplies the unit vector and the distance $E_1$ to the depth map generating section 238.

As described above, according to the first modification example of the first embodiment of the present technology, the VR terminal 200 measures distances from a plurality of ceiling lights on the basis of coordinates of projected points of the lights and can therefore measure distances even in a case where the irradiation light sources 111 and 112 that are alternately turned on do not exist.

Second Modification Example

In the above-described first embodiment, the distance measuring module 210 is provided in the VR terminal 200. However, the distance measuring module 210 can also be provided in an apparatus or device other than the VR terminal 200. For example, the distance measuring module 210 may be provided in an unmanned aerial vehicle (so-called drone). In a case where a plurality of unmanned aerial vehicles fly in formation, it is necessary to maintain a certain distance from accompanying vehicles. In such flight control or the like, it is possible to use information obtained by the distance measuring module 210 measuring a distance. This distance measuring system in a second modification example of the first embodiment is different from that of the first embodiment in that the distance measuring module 210 is provided in an unmanned aerial vehicle.

Figure 20:
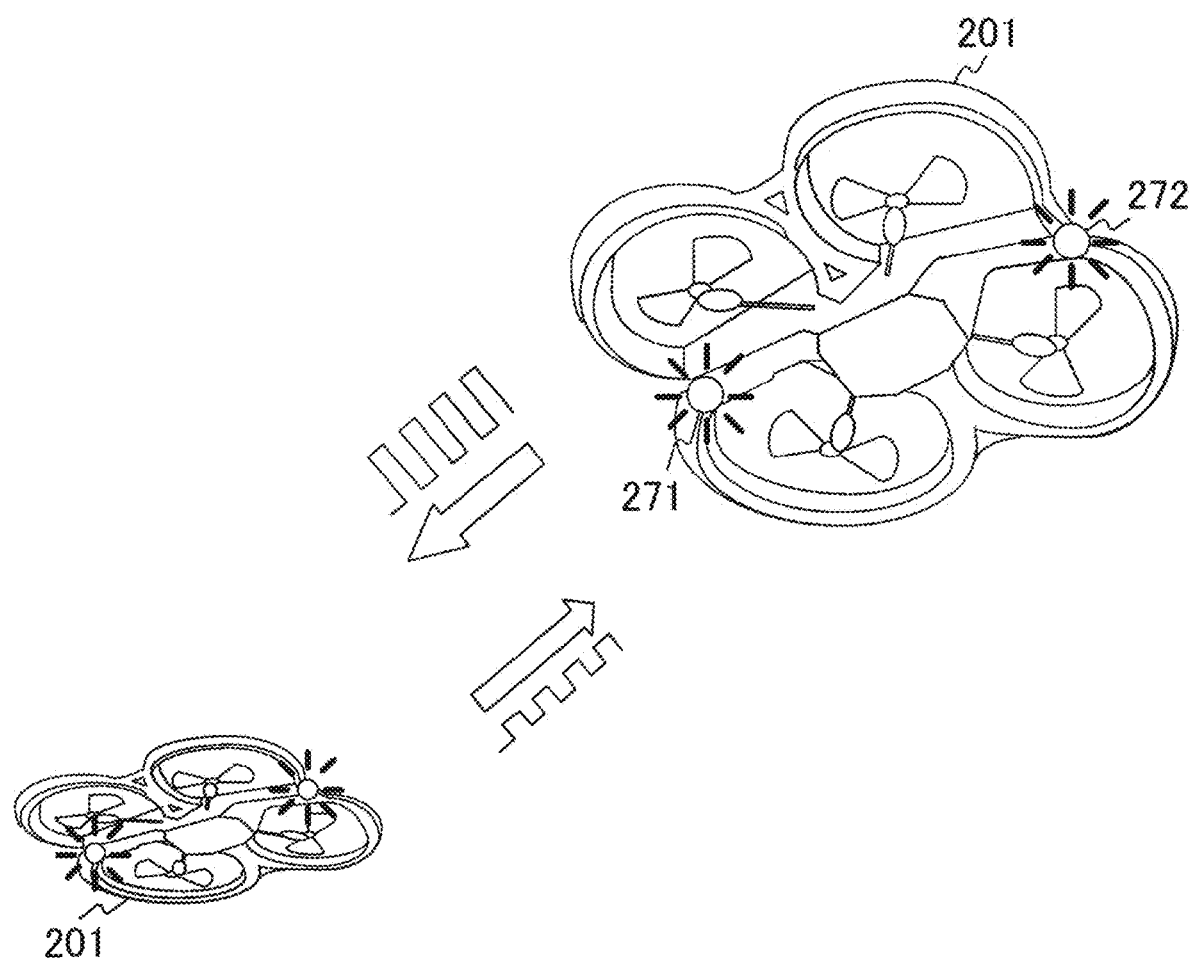
FIG. 20 is a general view showing a configuration example of a distance measuring system in a second modification example of the first embodiment of the present technology.

FIG. 20 is a general view showing a configuration example of a distance measuring system in the second modification example of the first embodiment of the present technology. This distance measuring system includes a plurality of unmanned aerial vehicles 201. Each of the unmanned aerial vehicles 201 includes light emitting sections 271 and 272 and the distance measuring module 210. The light emitting sections 271 and 272 are fixed to specified positions of the unmanned aerial vehicle 201 and an interval W therebetween is fixed. Note that the distance measuring module 210 is omitted in FIG. 20.

Each unmanned aerial vehicle 201 detects a phase difference between light from a light emitting section 271 of another unmanned aerial vehicle 201 and light from a light emitting section 272 thereof and measures a distance $E_1$ from the light emitting section 271 by a method similar to that of the first embodiment. The unmanned aerial vehicle 201 performs flight control such as maintaining a certain distance from the other vehicle on the basis of this measured distance $E_1$.

As described above, each unmanned aerial vehicle 201 includes the light emitting sections 271 and 272 in the own vehicle body. However, the unmanned aerial vehicle 201 measures a distance by using a quantity of received irradiation light from another vehicle body, instead of using reflected light of irradiation light from the own vehicle. As compared to a general ToF method of emitting irradiation light and receiving reflected light, it is unnecessary to transmit and reflect light and light is not absorbed by an object. This makes it possible to reduce light emitting quantities of the light emitting sections 271 and 272. Therefore, it is possible to reduce power consumption of the unmanned aerial vehicle 201 because the light emitting quantities are small. Further, when the light emitting quantities are fixed, the quantities of received light are increased, as compared to a case of receiving reflected light. This makes it possible to improve distance measuring accuracy.

Figure 21:
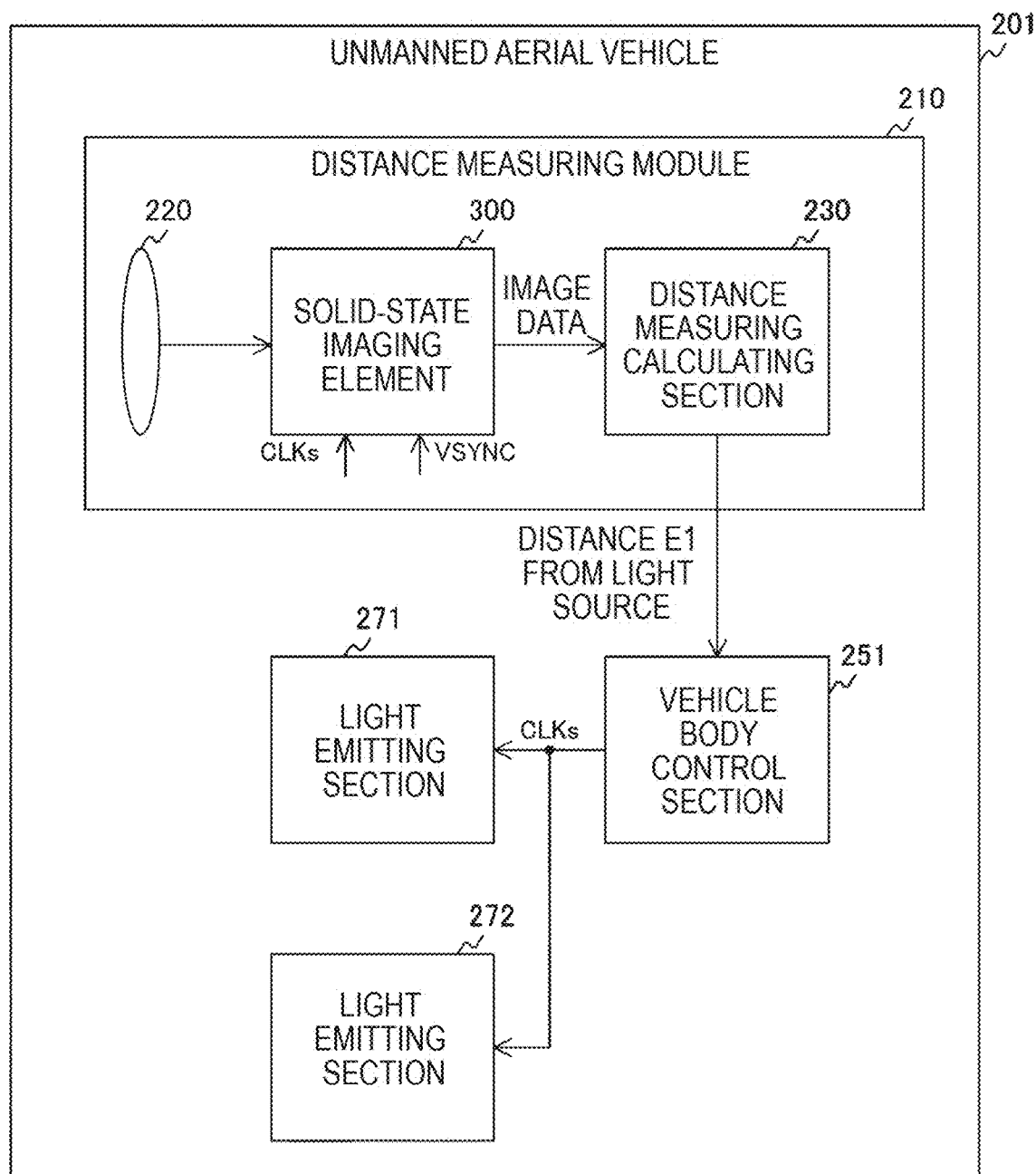
FIG. 21 is a block diagram showing a configuration example of an unmanned aerial vehicle in the second modification example of the first embodiment of the present technology.

FIG. 21 is a block diagram showing a configuration example of the unmanned aerial vehicle 201 in the second modification example of the first embodiment of the present technology. This unmanned aerial vehicle 201 includes the distance measuring module 210, a vehicle body control section 251, and the light emitting sections 271 and 272.

The distance measuring module 210 measures the distance $E_1$ from the light emitting section 271 of another vehicle body that is different from the own vehicle and supplies the distance to the vehicle body control section 251.

The vehicle body control section 251 controls the whole unmanned aerial vehicle 201. This vehicle body control section 251 supplies a reference clock CLKs to the light emitting sections 271 and 272 and the solid-state imaging element 300. Further, the vehicle body control section 251 controls speed and a direction of travel of the unmanned aerial vehicle 201 on the basis of the distance $E_1$. For example, the vehicle body control section 251 performs control so that the distance $E_1$ is close to a certain value. With this control, a plurality of unmanned aerial vehicles 210 can fly while maintaining a certain distance from each other. The light emitting sections 271 and 272 emit light in synchronization with the reference clock CLKs.

Figure 22:
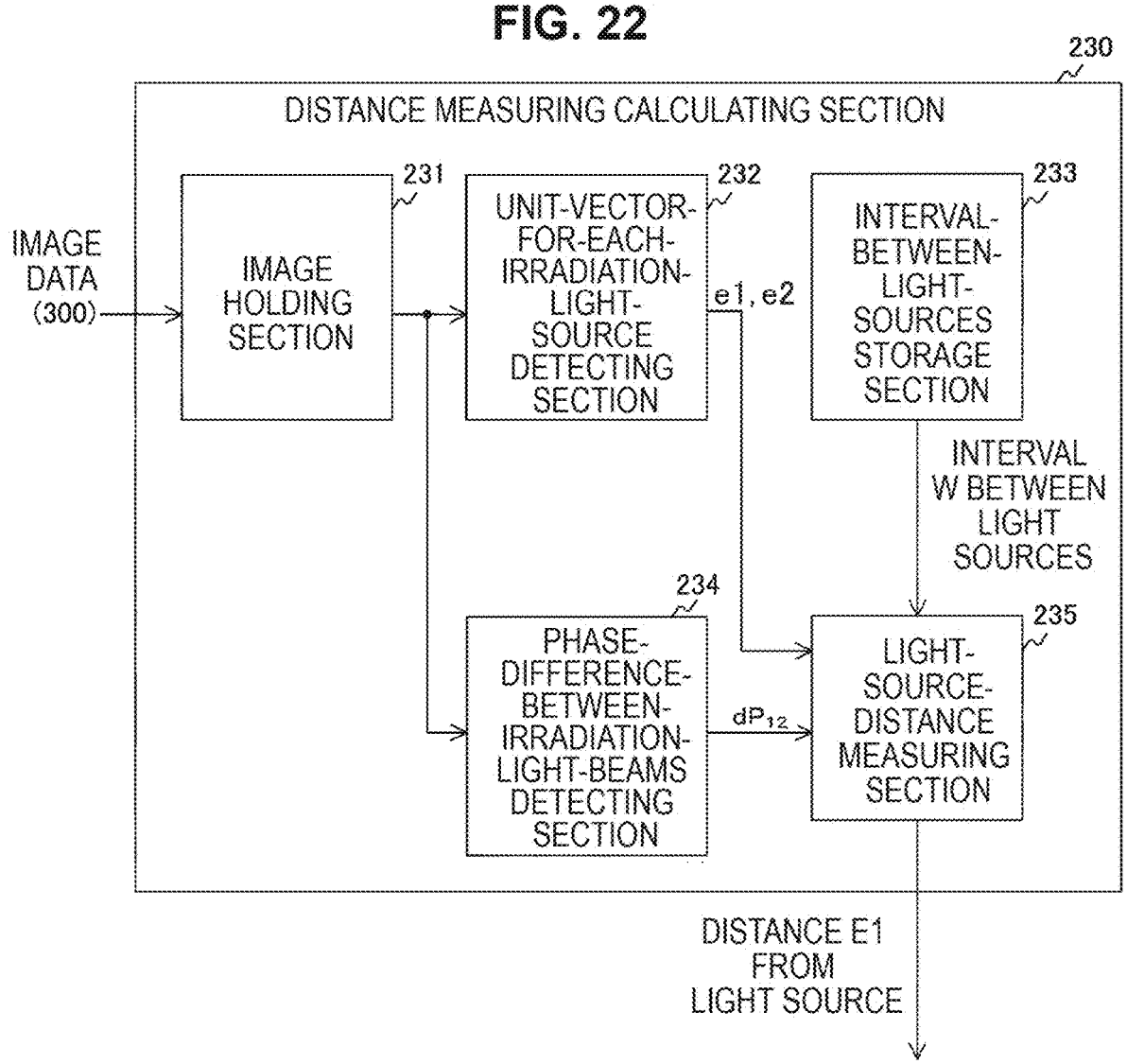
FIG. 22 is a block diagram showing a configuration example of a distance measuring calculating section in the second modification example of the first embodiment of the present technology.

FIG. 22 is a block diagram showing a configuration example of the distance measuring calculating section 230 in the second modification example of the first embodiment of the present technology. This distance measuring calculating section 230 in the second modification example of the first embodiment is different from that of the first embodiment in that the unit-vector-for-each-reflected-light-source detecting section 236, the phase-difference-between-irradiation-light-and-reflected-light detecting section 237, and the depth map generating section 238 are not provided.

As described above, according to the second modification example of the first embodiment of the present technology, the unmanned aerial vehicle 201 detects a phase difference between light beams from the light emitting sections 271 and 272 of an accompanying vehicle, and therefore a plurality of unmanned aerial vehicles 201 can measure a distance from each other.

2. Second Embodiment

[Configuration Example of Distance Measuring System]

In the above-described first embodiment, the VR terminal 200 measures a distance by using a phase difference between light beams from a plurality of point light sources (e.g., the irradiation light sources 111 and 112). However, in a case where those point light sources are not arranged in the vicinity of a target whose distance is to be measured, the distance cannot be measured. Even in this case, in a case where a linear light source having a shape of, for example, a fluorescent lamp is arranged in a room in advance, the VR terminal 200 can measure a distance by using a phase difference between light beams from the linear light source. For example, even in a case where the external device 110 including a point light source does not exist in the room, there is a light source for illumination in the room in many cases. Therefore, when the light source for illumination can be used as an external light source, the VR terminal 200 can measure a distance. This VR terminal 200 in the second embodiment is different from that of the first embodiment in that a distance is measured by using a phase difference of light from a linear light source.

Figure 23:
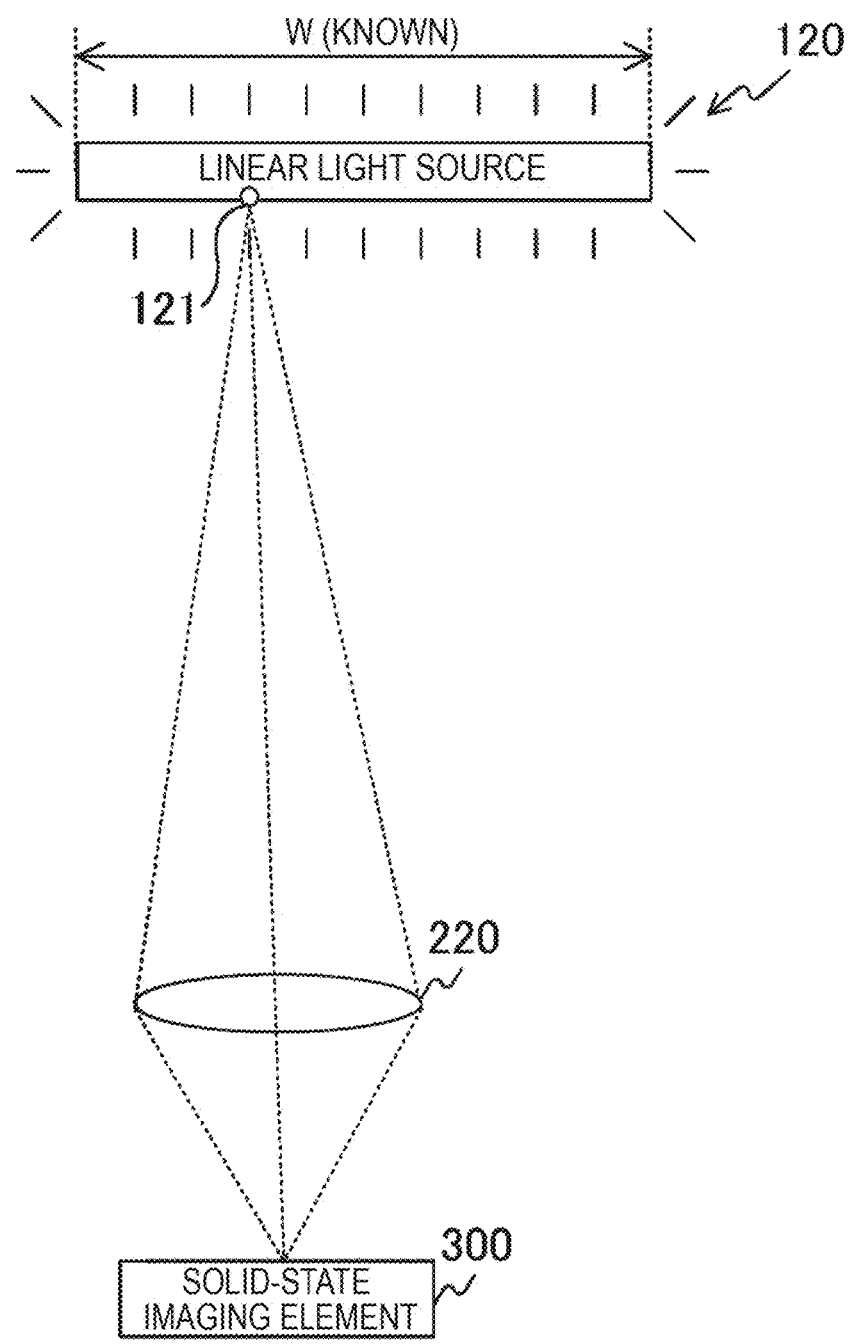
FIG. 23 is a diagram showing an example of a linear light source in a second embodiment of the present technology.

FIG. 23 is a diagram showing an example of a linear light source 120 in the second embodiment of the present technology. The linear light source 120 is expected to be, for example, a fluorescent-lamp-like light source or a linear light emitting diode. The whole linear light source 120 blinks with a certain frequency. Therefore, a phase difference between irradiation light beams from points on the linear light source 120 at the time of irradiation is "0". Further, a width W of the linear light source 120 is stored on the VR terminal 200 in advance as known data.

Herein, a point 121 on the linear light source 120 is brought into focus. In a case where the distance measuring module 210 focuses on this point 121, light from the point 121 is collected by the imaging lens 220 on a single point on the solid-state imaging element 300 and is not mixed with light from another point. Therefore, it is possible to use any two points on the linear light source 120 as individual irradiation light sources. Thus, the VR terminal 200 can measure distances from those light sources by a method similar to that of the first embodiment.

Figure 24:
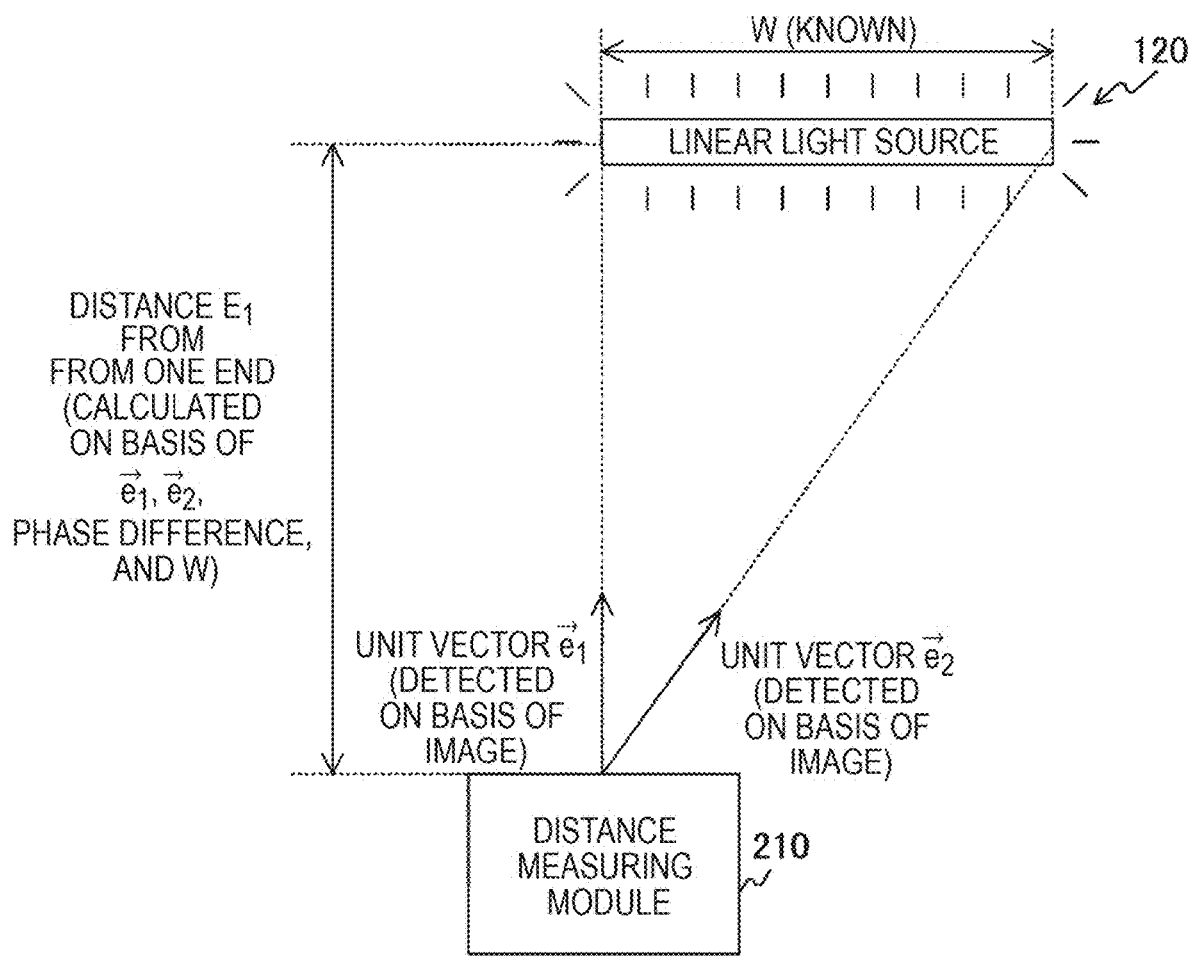
FIG. 24 is a diagram for describing a method of measuring a distance from an irradiation light source in the second embodiment of the present technology.

FIG. 24 is a diagram for describing a method of measuring a distance from an irradiation light source in the second embodiment of the present technology. The VR terminal 200 uses both ends of the linear light source 120 as irradiation light sources and measures distances from those light sources. First, the VR terminal 200 detects a phase difference between light beams from those irradiation light sources and detects a unit vector of each of the irradiation light sources. Then, the VR terminal 200 measures a distance from any one of both the ends on the basis of the detected phase difference and unit vector and the known width W.

Note that the VR terminal 200 focuses on both the ends of the linear light source 120 and detects the phase difference between irradiation light beams thereof. However, two points other than both the ends may be brought into focus. Further, the VR terminal 200 may focus on two points on a light source having another shape, such as a surface light source or a spherical, ring-shaped, or disc-shaped light source, instead of the linear light source 120.

Figure 25:
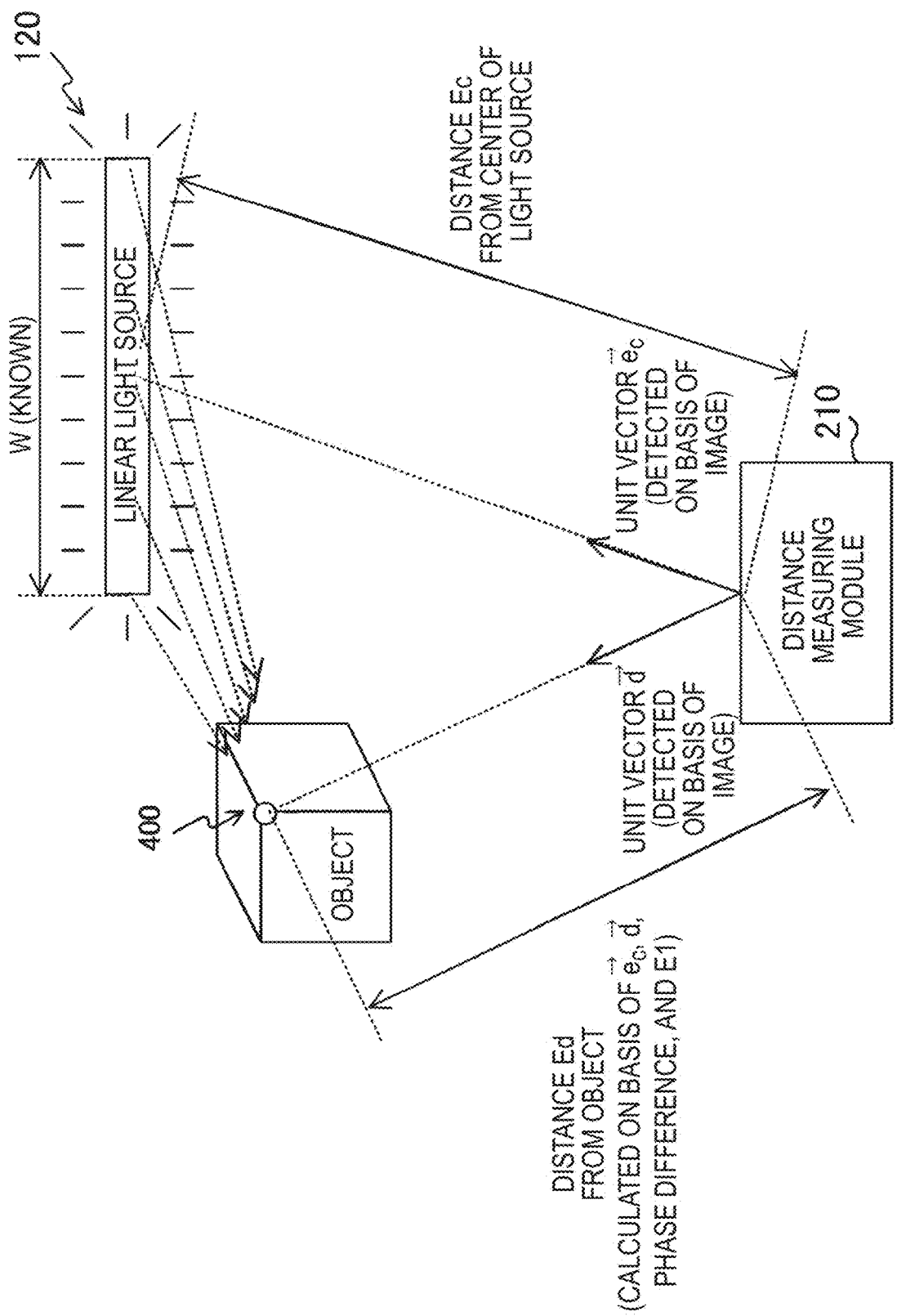
FIG. 25 is a diagram for describing a method of measuring a distance from an object in the second embodiment of the present technology.

FIG. 25 is a diagram for describing a method of measuring a distance from an object in the second embodiment of the present technology. In a case where irradiation light from the linear light source 120 is reflected by a reflected point on the object, the reflected point receives light from each of a plurality of points on the linear light source 120. A distance from the reflected point to each point on the linear light source 120 is different, and therefore a phase of the reflected light does not necessarily have a value simply in proportion to a distance from the linear light source 120.

Further, the VR terminal 200 detects a unit vector of each of the plurality of points on the linear light source 120. Further, for each point, the VR terminal 200 measures a phase of irradiation light from the point.

Herein, an axis along the linear light source 120 is set as an X axis, and two axes orthogonal to the X axis are set as a Y axis and a Z axis. The straight linear light source 120 have a rotational symmetry shape, and therefore the Y axis and the Z axis have arbitrariness. However, a phase of irradiation light also has a rotational symmetry shape, which causes no problem.

Further, generally, directions of axes of a coordinate system of the light source are different from those of a coordinate system of a camera (the VR terminal 200). However, hereinafter, those directions are assumed to be the same for convenience of explanation. Even in a case where the directions of the axes of the coordinate systems are different, it is possible to easily convert one axis in accordance with the other axis when a posture of the linear light source 120 seen from the VR terminal 200 is known.

Based on those presupposes, reflected light is expressed by the following expression on the basis of an overlap of light transmitted from each point on the linear light source 120.

[Math. 7]

$$L(\vec{D},t) = \int L_E(\vec{D},t) dE \quad \text{Expression 15}$$

In the above expression, the symbol "t" denotes time, and the unit thereof is, for example, second(s). The symbol "D" having an arrow denotes a vector from the VR terminal 200 to a reflected point. Further, the left side indicates reflected light at the reflected point at the time t. Further, the right side indicates a result of an integral of light from each point on the linear light source 120.

A phase of the reflected light can be expressed by the following expression on the basis of Expression 15.

[Math. 8]

$$P(\vec{D}) = P_{Ec} + g(\vec{D} - \vec{E}_C) \quad \text{Expression 16}$$

In the above expression, the left side indicates a phase of reflected light at a reflected point D. Further, the symbol "$P_{EC}$" denotes a phase of light from the center of the linear light source 120. The unit of those phases is, for example, radian. Further, the part "g( )" indicates a function showing a relationship between a position of the reflected point from the center of the linear light source 120 and a phase difference between irradiation light and reflected light. This function g( ) is obtained in advance by, for example, using a value actually measured by some calibration. Alternatively, the function g( ) may be theoretically obtained.

Further, a phase $P(u_c)$ of irradiation light from the center of the linear light source 120 at the time of receiving the light is expressed by the following expression on the basis of the principle of the ToF method.

$$P(u_c) = P_{EC} - (2\pi f/c) \cdot Ec \quad \text{Expression 17}$$

In the above expression, the symbol "Ec" denotes a distance from the center of the linear light source 120, and the unit thereof is, for example, meter (m). Coordinates of Ec are obtained on the basis of a distance $E_1$ from one end of the linear light source 120 and a unit vector of each thereof. The symbol "$P_{Ec}$" denotes a phase of irradiation light from the center of the linear light source 120 at the time of irradiation, and the unit thereof is, for example, radian.

Similarly, a phase of reflected light at the time of receiving the light is expressed by the following expression.

[Math. 9]

$$P(u_D) = P(\vec{D}) - \frac{2\pi f}{c} D \quad \text{Expression 18}$$

The following expression is obtained by substituting Expression 18 for Expression 16.

[Math. 10]

$$P(u_D) = P_{Ec} + g(\vec{D} - \vec{E}_C) - \frac{2\pi f}{c} D \quad \text{Expression 19}$$

The following expression is satisfied by subtracting both the sides of Expression 17 from both the sides of Expression 19.

[Math. 11]

$$P(u_D) - P(u_C) - \left\{ g(\vec{D} - \vec{E}_C) - \frac{2\pi f}{c}(D - \vec{E}c) \right\} = 0 \quad \text{Expression 20}$$

In the above expression, the symbol "D" having an arrow denotes a vector showing a direction to the reflected point, and this vector can be replaced with a value obtained by multiplying the distance D by a unit vector of the direction. Therefore, Expression 20 can be replaced with the following expression.

[Math. 12]

$$P(u_D) - P(u_C) - \left\{ g(D\vec{d} - \vec{E}_C) - \frac{2\pi f}{c}(D - \vec{E}c) \right\} = 0 \quad \text{Expression 21}$$

In the above expression, the symbol "d" having an arrow denotes a unit vector showing a direction to the reflected point.

The VR terminal 200 detects a unit vector of the center of the linear light source 120 and a unit vector of the reflected point and detects a phase difference between irradiation light and reflected light at the time of receiving the light. Then, the VR terminal 200 substitutes those unit vectors and phase difference and the known distance Ec for Expression 21 to calculate the distance D from the reflected point.

As described above, according to the second embodiment of the present technology, the VR terminal 200 measures distances from both the ends of the linear light source 120 on the basis of a phase difference between light beams from both the ends and can therefore measure distances even in a case where no point light source exists. For example, even in a case where the external device 110 including a point light source does not exist in a room, the VR terminal 200 can measure distances by using the linear light source 120 having a shape of a fluorescent lamp.

4. Application Example 1

A technology according to the present disclosure is applicable to a technology that is so-called Internet of things (IoT). IoT is a mechanism in which an IoT device 9100 that is a "thing" is connected to another IoT device 9003, the Internet, a cloud 9005, and the like and exchanges information to control each other. IoT can be used in various industries such as agriculture, houses, automobiles, manufacture, distribution, and energy.

Figure 26:
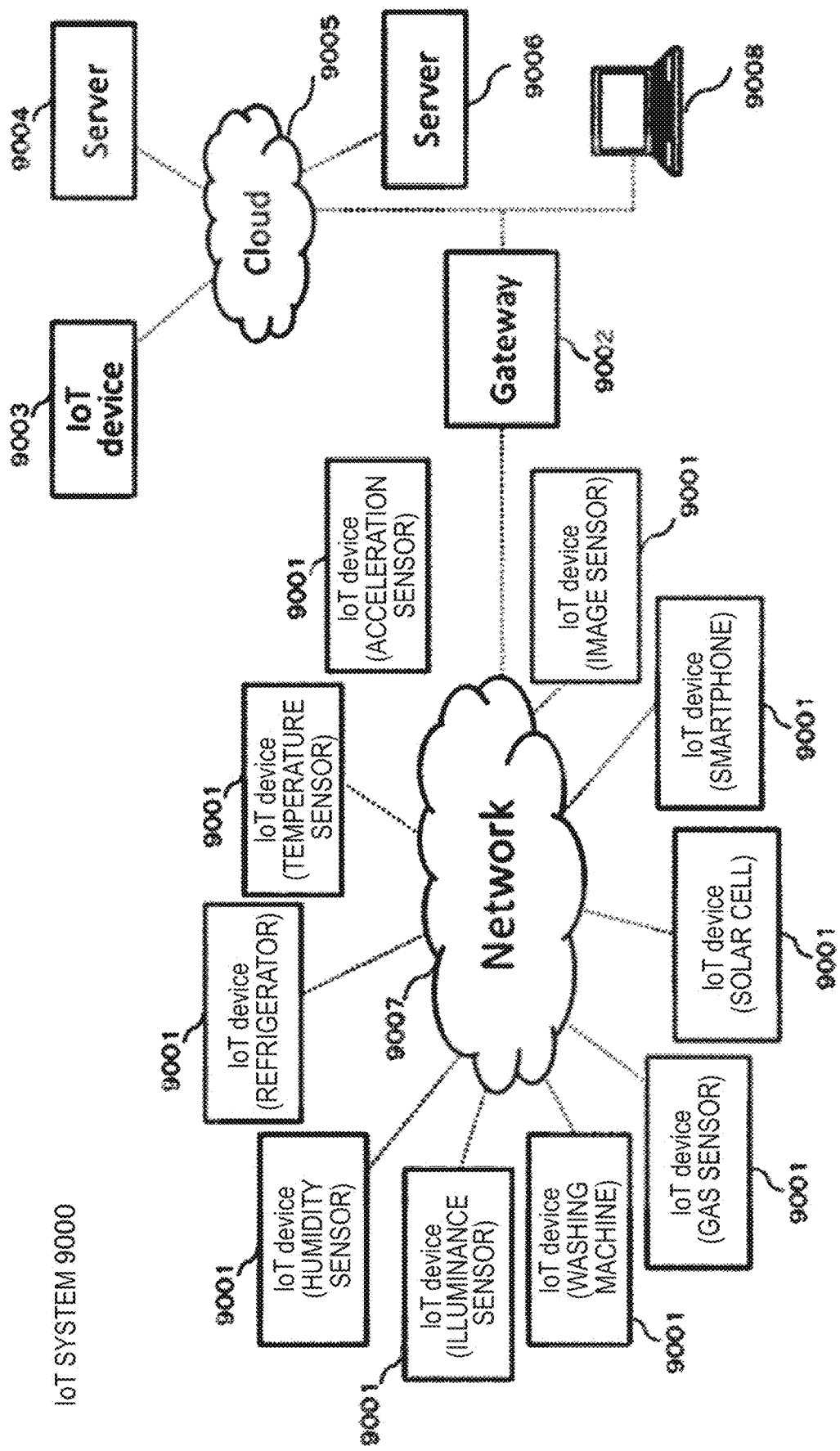
FIG. 26 is a diagram showing an example of a schematic configuration of an IoT system 9000.

FIG. 26 is a diagram showing an example of a schematic configuration of an IoT system 9000 to which the technology according to the present disclosure is applicable.

An IoT device 9001 encompasses various kinds of sensors such as a temperature sensor, a humidity sensor, an illuminance sensor, an acceleration sensor, a distance sensor, an image sensor, a gas sensor, and a motion sensor. Further, the IoT device 9001 may encompass terminals such as a smartphone, a mobile phone, a wearable terminal, and a game console. Power is supplied to the IoT device 9001 from an AC power supply, a DC power supply, a battery, non-contact power supply, so-called energy harvesting, or the like. The IoT device 9001 can perform communication via wired, wireless, proximity wireless communication, or the like. As a communication method, 3G/LTE, WiFi, IEEE802.15.4, Bluetooth, Zigbee (registered trademark), Z-Wave, or the like is suitably used. The IoT device 9001 may switch those plurality of communication means to perform communication.

The IoT device 9001 may form a peer-to-peer, star, tree, or meshed network. The IoT device 9001 may be connected to the external cloud 9005 directly or via a gateway 9002. An address is given to the IoT device 9001 by using IPv4, IPv6, 6LoWPAN, or the like. Data collected from the IoT device 9001 is transmitted to another IoT device 9003, a server 9004, the cloud 9005, or the like. A timing at which or a frequency with which data is transmitted from the IoT device 9001 may be suitably adjusted, and data may be compressed and transmitted. Such data may be used as it is, or data may be analyzed by a computer 9008 with the use of various means such as statistical analysis, machine learning, data mining, cluster analysis, discriminant analysis, combination analysis, and time series analysis. By using such data, it is possible to provide various services such as control, warning, monitoring, visualization, automation, and optimization.

The technology according to the present disclosure are also applicable to devices and services regarding a house. The IoT device 9001 in a house encompasses a washing machine, a drying machine, a dryer, a microwave oven, a dishwasher, a refrigerator, an oven, a rice cooker, a cooking tool, a gas appliance, a fire alarm, a thermostat, an air conditioner, a television, a recorder, audio equipment, lighting equipment, a water heater, a hot water dispenser, a vacuum cleaner, a fan, an air cleaner, a security camera, a lock, a door/shutter opening and closing apparatus, a sprinkler, a toilet, a thermometer, a weighing scale, a sphygmomanometer, and the like. The IoT device 9001 may further encompass a solar cell, a fuel cell, a storage battery, a gas meter, an electricity meter, and a distribution board.

A communication method of the IoT device 9001 in a house is desirably a low-power-consumption communication method. Further, the IoT device 9001 may perform communication via WiFi inside the house and via 3G/LTE outside the house. An external server 9006 for controlling the IoT device may be installed in the cloud 9005 to control the IoT device 9001. The IoT device 9001 transmits data such as a situation of a home appliance, temperature, humidity, energy consumption, and presence/absence of a person/animal inside/outside the house. Data transmitted from the home appliances is accumulated in the external server 9006 via the cloud 9005. A new service is provided on the basis of such data. Such an IoT device 9001 can be controlled by audio with the use of an audio recognition technology.

Further, it is possible to directly transmit information from various home appliances to a television to visualize a state of the various home appliances. Further, various sensors determine presence/absence of a resident and transmit data to an air conditioner, a light, and the like and can therefore turn on and off power supplies thereof. Furthermore, it is possible to display an advertisement on displays provided on the various home appliances via the Internet.

Hereinabove, there have been described an example of the IoT system 9000 to which the technology according to the present disclosure is applicable. The technology according to the present disclosure is suitably applicable to a distance measuring sensor in the IoT device 9001 in the configuration described above. By applying the technology according to the present disclosure to the distance measuring sensor, it is possible to reduce power consumption of the IoT device 9001.

5. Application Example 2

The technology according to the present disclosure is applicable to a variety of products. For example, the technology according to the present disclosure is implemented as apparatuses mounted on any type of mobile objects such as automobiles, electric vehicles, hybrid electric vehicles, motorcycles, bicycles, personal mobilities, airplanes, drones, ships, robots, construction machines, and agricultural machines (tractors).

Figure 27:
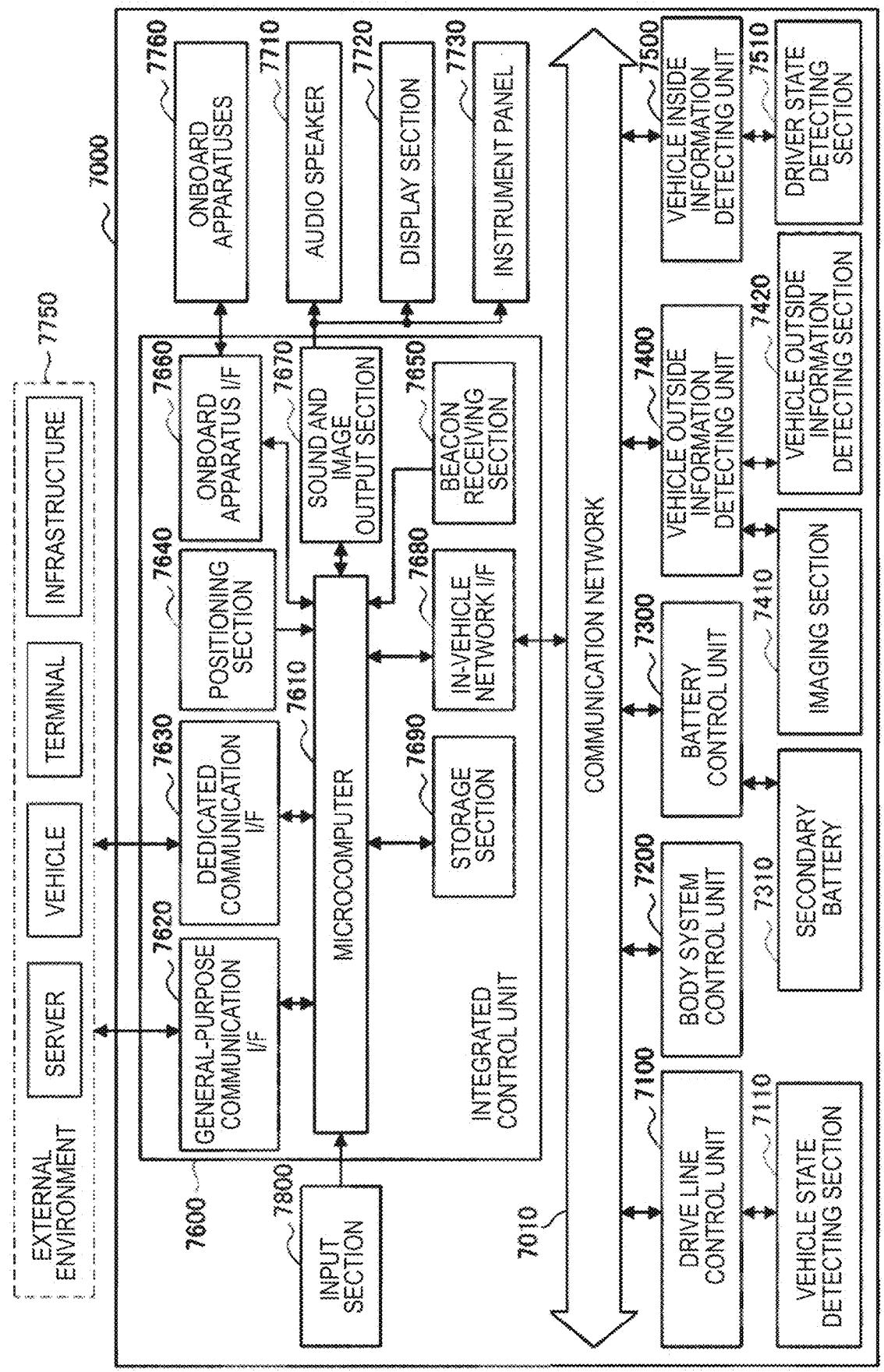
FIG. 27 is a block diagram showing an example of a schematic configuration of a vehicle control system.

FIG. 27 is a block diagram illustrating a schematic configuration example of a vehicle control system 7000 that is an example of a mobile object control system to which the technology according to the present disclosure can be applied. The vehicle control system 7000 includes a plurality of electronic control units connected via a communication network 7010. In the example illustrated in FIG. 27, the vehicle control system 7000 includes a drive line control unit 7100, a body system control unit 7200, a battery control unit 7300, a vehicle outside information detecting unit 7400, a vehicle inside information detecting unit 7500, and an integrated control unit 7600. The communication network 7010, which connects the plurality of these control units, may be an in-vehicle communication network such as a controller area network (CAN), a local interconnect network (LIN), a local area network (LAN), or FlexRay (registered trademark) that is compliant with any standard.

Each control unit includes a microcomputer that performs operation processing in accordance with a variety of programs, a storage section that stores the programs, parameters used for the variety of operations, or the like executed by the microcomputer, and a driving circuit that drives apparatuses subjected to various types of control. Each control unit includes a network I/F used to communicate with the other control units via the communication network 7010, and a communication I/F used to communicate with apparatuses, sensors, or the like outside and inside the vehicle through wired communication or wireless communication. FIG. 27 illustrates a microcomputer 7610, a general-purpose communication I/F 7620, a dedicated communication I/F 7630, a positioning section 7640, a beacon receiving section 7650, an onboard apparatus I/F 7660, a sound and image output section 7670, an in-vehicle network I/F 7680, and a storage section 7690 as functional components of the integrated control unit 7600. Each of the other control units similarly includes a microcomputer, a communication I/F, a storage section, and the like.

The drive line control unit 7100 controls the operation of apparatus related to the drive line of the vehicle in accordance with a variety of programs. For example, the drive line control unit 7100 functions as a control apparatus for a driving force generating apparatus such as an internal combustion engine or a driving motor that generates the driving force of the vehicle, a driving force transferring mechanism that transfers the driving force to wheels, a steering mechanism that adjusts the steering angle of the vehicle, a braking apparatus that generates the braking force of the vehicle, and the like. The drive line control unit 7100 may have the function of a control apparatus for an antilock brake system (ABS) or an electronic stability control (ESC).

The drive line control unit 7100 is connected to a vehicle state detecting section 7110. The vehicle state detecting section 7110 includes, for example, at least one of sensors such as a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 7100 uses a signal input from the vehicle state detecting section 7110 to perform operation processing, and controls the internal combustion engine, the driving motors, the electric power steering apparatus, the braking apparatus, or the like.

The body system control unit 7200 controls the operations of a variety of apparatuses attached to the vehicle body in accordance with a variety of programs. For example, the body system control unit 7200 functions as a control apparatus for a keyless entry system, a smart key system, a power window apparatus, or a variety of lights such as a headlight, a backup light, a brake light, a blinker, or a fog lamp. In this case, the body system control unit 7200 can receive radio waves transmitted from a portable apparatus that serves instead of the key or signals of a variety of switches. The body system control unit 7200 receives these radio waves or signals, and controls the vehicle door lock apparatus, the power window apparatus, the lights, or the like.

The battery control unit 7300 controls a secondary battery 7310 in accordance with a variety of programs. The secondary battery 7310 serves as a power supply source of a driving motor. For example, the battery control unit 7300 receives information such as the battery temperature, the battery output voltage, or the remaining battery capacity from a battery apparatus including the secondary battery 7310. The battery control unit 7300 uses these signals to perform operation processing, and performs temperature adjusting control on the secondary battery 7310 or controls a cooling apparatus or the like included in the battery apparatus.

The vehicle outside information detecting unit 7400 detects information regarding the outside of the vehicle including the vehicle control system 7000. For example, the vehicle outside information detecting unit 7400 is connected to at least one of an imaging section 7410 and a vehicle outside information detecting section 7420. The imaging section 7410 includes at least one of a time of flight (ToF) camera, a stereo camera, a monocular camera, an infrared camera, and other cameras. The vehicle outside information detecting section 7420 includes, for example, at least one of an environment sensor that detects the current weather, and a surrounding information detecting sensor that detects another vehicle, an obstacle, a pedestrian, or the like around the vehicle including the vehicle control system 7000.

The environment sensor may be, for example, at least one of a raindrop sensor that detects rainy weather, a fog sensor that detects a fog, a sunshine sensor that detects the degree of sunshine, a snow sensor that detects a snowfall. The surrounding information detecting sensor may be at least one of an ultrasonic sensor, a radar apparatus, and a light detection and ranging/laser imaging detection and ranging (LIDAR) apparatus. These imaging section 7410 and vehicle outside information detecting section 7420 may be installed as independent sensors or apparatuses, or as an apparatus into which sensors and apparatuses are integrated.

Figure 28:
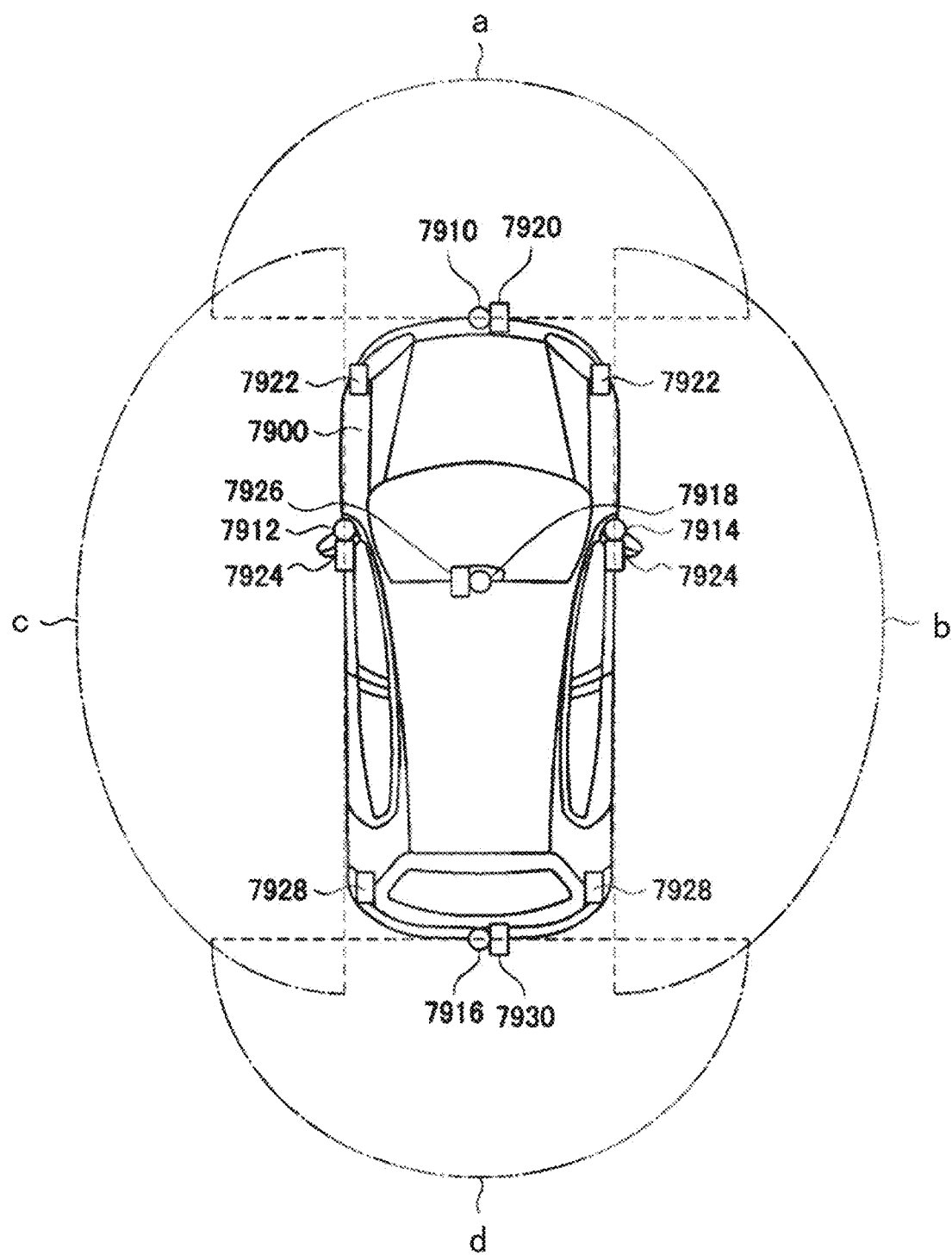
FIG. 28 is an explanatory view showing an example of installation positions of a vehicle outside information detecting section and an imaging section.

Here, FIG. 28 illustrates an example of the installation positions of the imaging section 7410 and the vehicle outside information detecting section 7420. Imaging sections 7910, 7912, 7914, 7916, and 7918 are positioned, for example, at at least one of the front nose, a side mirror, the rear bumper, the back door, and the upper part of the windshield in the vehicle compartment of a vehicle 7900. The imaging section 7910 attached to the front nose and the imaging section 7918 attached to the upper part of the windshield in the vehicle compartment chiefly acquire images of the area ahead of the vehicle 7900. The imaging sections 7912 and 7914 attached to the side mirrors chiefly acquire images of the areas on the sides of the vehicle 7900. The imaging section 7916 attached to the rear bumper or the back door chiefly acquires images of the area behind the vehicle 7900. The imaging section 7918 attached to the upper part of the windshield in the vehicle compartment is used chiefly to detect a preceding vehicle, a pedestrian, an obstacle, a traffic light, a traffic sign, a lane, or the like.

Note that FIG. 28 illustrates an example of the respective imaging ranges of the imaging sections 7910, 7912, 7914, and 7916. An imaging range a represents the imaging range of the imaging section 7910 attached to the front nose. Imaging ranges b and c respectively represent the imaging ranges of the imaging sections 7912 and 7914 attached to the side mirrors. An imaging range d represents the imaging range of the imaging section 7916 attached to the rear bumper or the back door. For example, overlaying image data captured by the imaging sections 7910, 7912, 7914, and 7916 offers an overhead image that looks down on the vehicle 7900.

Vehicle outside information detecting sections 7920, 7922, 7924, 7926, 7928, and 7930 attached to the front, the rear, the sides, the corners, and the upper part of the windshield in the vehicle compartment of the vehicle 7900 may be, for example, ultrasonic sensors or radar apparatuses. The vehicle outside information detecting sections 7920, 7926, and 7930 attached to the front nose, the rear bumper, the back door, and the upper part of the windshield in the vehicle compartment of the vehicle 7900 may be, for example, LIDAR apparatuses. These vehicle outside information detecting sections 7920 to 7930 are used chiefly to detect a preceding vehicle, a pedestrian, an obstacle, or the like.

The description will continue with reference to FIG. 27 again. The vehicle outside information detecting unit 7400 causes the imaging section 7410 to capture images of the outside of the vehicle, and receives the captured image data. In addition, the vehicle outside information detecting unit 7400 receives detection information from the connected vehicle outside information detecting section 7420. In the case where the vehicle outside information detecting section 7420 is an ultrasonic sensor, a radar apparatus, or a LIDAR apparatus, the vehicle outside information detecting unit 7400 causes ultrasound, radio waves, or the like to be transmitted, and receives the information of the received reflected waves. The vehicle outside information detecting unit 7400 may perform processing of detecting an object such as a person, a car, an obstacle, a traffic sign, or a letter on a road, or a process of detecting the distance on the basis of the received information. The vehicle outside information detecting unit 7400 may perform environment recognition processing of recognizing a rainfall, a fog, a road condition, or the like on the basis of the received information. The vehicle outside information detecting unit 7400 may compute the distance to an object outside the vehicle on the basis of the received information.

Further, the vehicle outside information detecting unit 7400 may perform image recognition processing of recognizing a person, a car, an obstacle, a traffic sign, a letter on a road, or the like, or processing of detecting the distance on the basis of the received image data. The vehicle outside information detecting unit 7400 may perform distortion correcting processing, positioning processing, or the like on the received image data, and combine image data captured by a different imaging section 7410 to generate an overhead view or a panoramic image. The vehicle outside information detecting unit 7400 may use the image data captured by the other imaging section 7410 to perform viewpoint converting processing.

The vehicle inside information detecting unit 7500 detects information regarding the inside of the vehicle. The vehicle inside information detecting unit 7500 is connected, for example, to a driver state detecting section 7510 that detects the state of the driver. The driver state detecting section 7510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 7500 may compute the degree of the driver's tiredness or the degree of the driver's concentration or determine whether the driver have a doze, on the basis of detection information input from the driver state detecting section 7510. The vehicle inside information detecting unit 7500 may perform processing such as noise cancelling processing on the picked-up sound signal.

The integrated control unit 7600 controls the overall operation inside the vehicle control system 7000 in accordance with a variety of programs. The integrated control unit 7600 is connected to an input section 7800. The input section 7800 is implemented as an apparatus, for example, a touch panel, a button, a microphone, a switch, a lever, or the like on which a passenger can perform an input operation. The integrated control unit 7600 may receive data obtained by recognizing the voice input through the microphone. The input section 7800 may be, for example, a remote control apparatus that uses infrared light or other radio waves, or an external connection apparatus such as a mobile telephone or a personal digital assistant (PDA) corresponding to the operation of the vehicle control system 7000. The input section 7800 may be, for example, a camera. In that case, a passenger can input information through gesture. Alternatively, data may be input that is obtained by detecting the movement of a wearable apparatus worn by a passenger. Moreover, the input section 7800 may include an input control circuit or the like that generates an input signal, for example, on the basis of information input by a passenger or the like using the above-described input section 7800, and outputs the generated input signal to the integrated control unit 7600. The passenger or the like operates this input section 7800, thereby inputting various types of data to the vehicle control system 7000 or instructing the vehicle control system 7000 about a processing operation.

The storage section 7690 may include a read only memory (ROM) that stores a variety of programs to be executed by a microcomputer, and a random access memory (RAM) that stores a variety of parameters, operation results, sensor values, or the like. In addition, the storage section 7690 may be implemented by a magnetic storage device such as a hard disk drive (HDD), a semiconductor storage device, an optical storage device, a magneto-optical storage device, or the like.

The general-purpose communication I/F 7620 is a general-purpose communication I/F that mediates in communication between a variety of apparatuses in an external environment 7750. The general-purpose communication I/F 7620 may implement a cellular communication protocol such as Global System of Mobile communications (GSM), WiMAX, Long Term Evolution (LTE) or LTE-Advanced (LTE-A), or other wireless communication protocols such as a wireless LAN (which is also referred to as Wi-Fi (registered trademark)) or Bluetooth (registered trademark). The general-purpose communication I/F 7620 may be connected to an apparatus (such as an application server or a control server) on an external network (such as the Internet, a cloud network, or a network specific to a service provider), for example, via a base station or an access point. In addition, the general-purpose communication I/F 7620 may be connected to a terminal (such as a terminal of the driver, a pedestrian or a store, or a machine type communication (MTC) terminal) in the vicinity of the vehicle, for example, using the peer-to-peer (P2P) technology.

The dedicated communication I/F 7630 is a communication I/F that supports a communication protocol defined for the purpose of use for vehicles. The dedicated communication I/F 7630 may implement a standard protocol, for example, wireless access in vehicle environment (WAVE), which is a combination of IEEE 802.11p for the lower layer and IEEE 1609 for the upper layer, dedicated short range communications (DSRC), or a cellular communication protocol. The dedicated communication I/F 7630 typically performs V2X communication. The V2X communication is a concept including one or more of vehicle-to-vehicle communication, vehicle-to-infrastructure communication, vehicle-to-home communication, and vehicle-to-pedestrian communication.

The positioning section 7640 receives, for example, global navigation satellite system (GNSS) signals (such as global positioning system (GPS) signals from a GPS satellite) from a GNSS satellite for positioning, and generates position information including the latitude, longitude, and altitude of the vehicle. Note that the positioning section 7640 may also identify the present position by exchanging signals with a wireless access point, or acquire position information from a terminal such as a mobile phone, a PHS, or a smartphone that has a positioning function.

The beacon receiving section 7650 receives radio waves or electromagnetic waves, for example, from a wireless station or the like installed on the road, and acquires information such as the present position, traffic congestion, closed roads, or necessary time. Note that the function of the beacon receiving section 7650 may be included in the above-described dedicated communication I/F 7630.

The onboard apparatus I/F 7660 is a communication interface that mediates in connections between the microcomputer 7610 and a variety of onboard apparatuses 7760 in the vehicle. The onboard apparatus I/F 7660 may use a wireless communication protocol such as a wireless LAN, Bluetooth (registered trademark), near field communication (NFC), or a wireless USB (WUSB) to establish a wireless connection. In addition, the onboard apparatus I/F 7660 may also establish a wired connection such as a universal serial bus (USB), a high-definition multimedia interface (HDMI), or a mobile high-definition link (MHL) via a connection terminal (not illustrated) (and a cable if necessary). The onboard apparatuses 7760 may include, for example, at least one of a mobile apparatus of a passenger, a wearable apparatus of a passenger, and an information apparatus carried into or attached to the vehicle. In addition, the onboard apparatuses 7760 may also include a navigation apparatus that searches for routes to any destination. The onboard apparatus I/F 7660 exchanges control signals or data signals with these onboard apparatuses 7760.

The in-vehicle network I/F 7680 is an interface that mediates in communication between the microcomputer 7610 and the communication network 7010. The in-vehicle network I/F 7680 transmits and receives signals or the like in compliance with a predetermined protocol supported by the communication network 7010.

The microcomputer 7610 of the integrated control unit 7600 controls the vehicle control system 7000 in accordance with a variety of programs on the basis of information acquired via at least one of the general-purpose communication I/F 7620, the dedicated communication I/F 7630, the positioning section 7640, the beacon receiving section 7650, the onboard apparatus I/F 7660, and the in-vehicle network I/F 7680. For example, the microcomputer 7610 may calculate a control target value of the driving force generating apparatus, the steering mechanism, or the braking apparatus on the basis of acquired information regarding the inside and outside of the vehicle, and output a control instruction to the drive line control unit 7100. For example, the microcomputer 7610 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like. In addition, the microcomputer 7610 may control the driving force generating apparatus, the steering mechanism, the braking apparatus, or the like on the basis of acquired information regarding the areas around the vehicle, thereby performing cooperative control for the purpose of automatic driving or the like that allows the vehicle to autonomously travel irrespective of any operation of a driver.

The microcomputer 7610 may generate three-dimensional distance information regarding the distance between the vehicle and an object such as a nearby structure or person on the basis of information acquired via at least one of the general-purpose communication I/F 7620, the dedicated communication I/F 7630, the positioning section 7640, the beacon receiving section 7650, the onboard apparatus I/F 7660, and the in-vehicle network I/F 7680, and create local map information including surrounding information regarding the present position of the vehicle. Further, the microcomputer 7610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The sound and image output section 7670 transmits an output signal of at least one of sound and images to an output apparatus capable of visually or aurally notifying a passenger of the vehicle or the outside of the vehicle of information. In the example of FIG. 27, an audio speaker 7710, a display section 7720, and an instrument panel 7730 are exemplified as the output apparatus. For example, the display section 7720 may include at least one of an onboard display and a head-up display. The display section 7720 may have an augmented reality (AR) display function. The output apparatus may also be an apparatus other than these apparatuses like a headphone, a wearable apparatus such as a glasses-type display worn by a passenger, a projector, or a lamp. In the case where the output apparatus is a display apparatus, the display apparatus visually displays a result obtained by the microcomputer 7610 performing a variety of processes or information received from another control unit in a variety of forms such as text, images, tables, or graphs. In addition, in the case where the output apparatus is a sound output apparatus, the sound output apparatus converts sound signals including reproduced sound data, acoustic data, or the like into analog signals, and aurally outputs the analog signals.

Note that, in the example illustrated in FIG. 27, at least two control units connected via the communication network 7010 may be integrated into one control unit. Alternatively, the individual control units may be configured as a plurality of control units. Moreover, the vehicle control system 7000 may also include another control unit that is not illustrated. Further, a part or the whole of the functions executed by any of the control units may be executed by another control unit in the above description. That is, as long as information is transmitted and received via the communication network 7010, predetermined operation processing may be performed by any of the control units. Similarly, a sensor or an apparatus connected to any of the control units may be connected to another control unit, and the control units may transmit and receive detection information to and from each other via the communication network 7010.

Note that a computer program for achieving each function of the distance measuring module 210 according to the present embodiment which has been described with reference to FIG. 2 can be mounted on any of the control units and the like. Further, it is also possible to provide a computer readable recording medium on which such a computer program is stored. The recording medium is, for example, a magnetic disk, an optical disc, a magneto-optical disc, or a flash memory. Further, the above computer program may be distributed via, for example, a network, instead of using a recording medium.

In the vehicle control system 7000 described above, the distance measuring module 210 according to the present embodiment which has been described with reference to FIG. 2 is applicable to the integrated control unit 7600 in the application example illustrated in FIG. 27. For example, the distance measuring module 210 corresponds to the vehicle outside information detecting unit 7400 of the integrated control unit 7600. For example, when a pair of external light sources are set as tail lamps of another vehicle, the vehicle exterior information detect unit 7400 (the distance measuring module 200) can measure distances from those tail lamps as a distance between two vehicles.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be other effects.

Additionally, the present technology may also be configured as below.

(1)

A distance measuring apparatus including:

a phase difference detecting section configured to detect a phase difference between light beams from a pair of external light sources; and a distance measuring section configured to acquire any one of a distance from one of the pair of external light sources and an interval between the pair of external light sources as known data and measure a distance from another of the pair of external light sources on a basis of the known data and the phase difference.

(2)

The distance measuring apparatus according to (1), in which the pair of external light sources are irradiation light sources that emit irradiation light, and the distance measuring section acquires the interval between the pair of external light sources as the known data.

(3)

The distance measuring apparatus according to (2), further including:

a pair of light emitting sections configured to emit irradiation light.

(4)

The distance measuring apparatus according to (2) or (3), in which the pair of external light sources are arranged at predetermined positions on a linear light source.

(5)

The distance measuring apparatus according to (1), in which the one of the pair of external light sources is an irradiation light source that emits irradiation light and the other is a reflected light source that reflects the irradiation light, and the distance measuring section acquires the distance from the one of the pair of external light sources as the known data.

(6)

The distance measuring apparatus according to (5), in which the irradiation light source includes a pair of irradiation light sources that are alternately turned on, and the distance measuring section acquires a distance from one of the pair of irradiation light sources on a basis of an interval between the pair of irradiation light sources.

(7)

The distance measuring apparatus according to (5), in which the distance measuring section acquires plane coordinates of a projected point obtained by projecting each of a plurality of spatial points whose three-dimensional coordinates are known onto a predetermined imaging plane and acquires the known data on a basis of the plane coordinates.

(8)

The distance measuring apparatus according to any of (1) to (7), in which the distance measuring section detects a unit vector showing a direction from each of the pair of external light sources and measures a distance from the other on a basis of the unit vector, the known data, and the phase difference.

(9)

The distance measuring apparatus according to any of (1) to (8), in which the phase difference detecting section and the distance measuring section are mounted on a vehicle, the pair of external light sources are tail lamps of another vehicle that is different from the vehicle, and the distance measuring section measures a distance between the vehicle and the other vehicle.

(10)

An electronic apparatus including:

a phase difference detecting section configured to detect a phase difference between light beams from a pair of external light sources;

a distance measuring section configured to acquire any one of a distance from one of the pair of external light sources and an interval between the pair of external light sources as known data and measure a distance from another of the pair of external light sources on a basis of the known data and the phase difference; and a control section configured to cause a display section to display predetermined information on a basis of the measured distance.

(11)

A method of controlling a distance measuring apparatus, the method including:

a phase difference detecting procedure of detecting a phase difference between light beams from a pair of external light sources; and a distance measuring procedure of acquiring any one of a distance from one of the pair of external light sources and an interval between the pair of external light sources as known data and measuring a distance from another of the pair of external light sources on a basis of the known data and the phase difference.

REFERENCE SIGNS LIST 110 external device
111, 112 irradiation light source
120 linear light source
131, 132, 133, 134 ceiling light
200 VR terminal
201 unmanned aerial vehicle
210 distance measuring module
220 imaging lens
230 distance measuring calculating section
231 image holding section
232 unit-vector-for-each-irradiation-light-source detecting section
233 interval-between-light-sources storage section
234 phase-difference-between-irradiation-light-beams detecting section
235, 242 light-source-distance measuring section
236 unit-vector-for-each-reflected-light-source detecting section
237 phase-difference-between-irradiation-light-and-reflected-light detecting section
238 depth map generating section
241 spatial coordinate storage section
250 terminal control section
251 vehicle body control section
260 display section
271, 272 light emitting section
300 solid-state imaging element
310 row scanning circuit
320 pixel array section
330 pixel circuit
331 light receiving element
332 transfer switch
333, 334 electric charge accumulating section
335, 336 selection switch
340 timing control section
350 AD conversion section
360 column scanning circuit
370 signal processing section
9001 IoT device

The invention claimed is:

1. A distance measuring apparatus comprising:
processing circuitry configured to:
detect a phase difference between light beams from a pair of external light sources, wherein the phase difference between the light beams is detected from only a single pair of external light sources; and
acquire any one of a distance from one of the pair of external light sources and a spacing between the pair of external light sources as known data and measure a distance from another of the pair of external light sources on a basis of the known data and the phase difference, wherein the processing circuitry is configured to process signals based on the light beams from the pair of external light sources, the pair of external light sources including first and second irradiation light sources that are alternately turned on such that only the first irradiation light source is turned on for a first period and only the second irradiation light source is turned on for a second period different from the first period.

2. The distance measuring apparatus according to claim 1, wherein
the processing circuitry is configured to acquire the spacing between the pair of external light sources as the known data.

3. The distance measuring apparatus according to claim 2, wherein
the pair of external light sources are arranged at predetermined positions on a linear light source.

4. The distance measuring apparatus according to claim 1, wherein
the processing circuitry is configured to acquire the distance from the one of the pair of external light sources as the known data.

5. The distance measuring apparatus according to claim 4, wherein
the processing circuitry is configured to acquire a distance from one of the pair of irradiation light sources on a basis of the spacing between the pair of irradiation light sources.

6. The distance measuring apparatus according to claim 4, wherein
the processing circuitry is configured to acquire plane coordinates of a projected point obtained by projecting each of a plurality of spatial points whose three-dimensional coordinates are known onto a predetermined imaging plane and to acquire the known data on a basis of the plane coordinates.

7. The distance measuring apparatus according to claim 1, wherein
the processing circuitry is configured to detect a unit vector showing a direction from each of the pair of external light sources and to measure a distance from the other on a basis of the unit vector, the known data, and the phase difference.

8. The distance measuring apparatus according to claim 1, wherein
the processing circuitry is mounted on a vehicle,
the pair of external light sources are tail lamps of another vehicle that is different from the vehicle, and
the processing circuitry is configured to measure a distance between the vehicle and the other vehicle.

9. An electronic apparatus comprising:
processing circuitry configured to:
detect a phase difference between light beams from a pair of external light sources, wherein the phase difference between the light beams is detected from only a single pair of external light sources;
acquire any one of a distance from one of the pair of external light sources and a spacing between the pair of external light sources as known data and measure a distance from another of the pair of external light sources on a basis of the known data and the phase difference, wherein the processing circuitry is configured to process signals based on the light beams from the pair of external light sources, the pair of external light sources including first and second irradiation light sources that are alternately turned on such that only the first irradiation light source is turned on for a first period and only the second irradiation light source is turned on for a second period different from the first period; and
cause a display section to display predetermined information on a basis of the measured distance.

10. A method of controlling a distance measuring apparatus, the method comprising:

detecting a phase difference between light beams from a pair of external light sources, wherein the phase difference between the light beams is detected from only a single pair of external light sources; and acquiring any one of a distance from one of the pair of external light sources and a spacing between the pair of external light sources as known data and measuring a distance from another of the pair of external light sources on a basis of the known data and the phase difference, including processing signals based on the light beams from the pair of external light sources, the pair of external light sources including first and second irradiation light sources that are alternately turned on such that only the first irradiation light source is turned on for a first period and only the second irradiation light source is turned on for a second period different from the first period.

* * * * *